United States Patent [19]
Yamaguchi

[11] Patent Number: 6,161,640
[45] Date of Patent: Dec. 19, 2000

[54] POWER OUTPUT DEVICE AND METHOD OF STOPPING PRIME MOVER IN THE POWER OUTPUT DEVICE

[75] Inventor: Katsuhiko Yamaguchi, Toyota, Japan

[73] Assignee: Toyota Jidosha Kabushiki Kaisha, Toyota, Japan

[21] Appl. No.: 09/146,433

[22] Filed: Sep. 3, 1998

[30]    Foreign Application Priority Data

Sep. 25, 1997  [JP]  Japan ................................. 9-279586

[51] Int. Cl.⁷ .............................................. B60K 1/00
[52] U.S. Cl. ..................... 180/65.8; 180/197; 701/53; 701/54
[58] Field of Search ................. 180/197, 65.8; 701/53, 54, 91, 87

[56]          References Cited

U.S. PATENT DOCUMENTS

| | | | |
|---|---|---|---|
| 4,562,894 | 1/1986 | Yang ........................................ | 180/65.2 |
| 5,265,498 | 11/1993 | Fodale et al. ............................. | 74/858 |
| 5,558,178 | 9/1996 | Hess et al. ................................ | 180/197 |
| 5,771,478 | 6/1998 | Tsukamoto et al. ...................... | 701/68 |
| 5,928,301 | 7/1999 | Soga et al. ................................ | 701/51 |
| 5,941,925 | 8/1999 | Hess et al. ................................ | 701/91 |
| 5,954,779 | 9/1999 | Dietzel .................................... | 701/87 |
| 5,997,434 | 12/1999 | Graf et al. ................................ | 477/98 |
| 6,000,488 | 12/1999 | Atkinson ................................. | 180/248 |

FOREIGN PATENT DOCUMENTS

| | | |
|---|---|---|
| 50-30223 | 3/1975 | Japan . |
| 10-98805 | 4/1998 | Japan . |

*Primary Examiner*—Eric Culbreth
*Assistant Examiner*—L. Lum
*Attorney, Agent, or Firm*—Oliff & Berridge, PLC

[57]          ABSTRACT

A power output device is provided with a planetary gear, an engine having a crank shaft coupled to the planetary gear, a motor secured to a sun gear and a motor secured to a ring gear. Even if there is no need to continue operation of the engine, the engine is not immediately stopped in view of the charge amount of a battery. For example, in the D (drive) range, a processing for stopping rotation of the engine with a predetermined deceleration is performed only if an ABS device is out of operation, the cancellation of reaction force is possible and the vehicle speed is within a predetermined range. Consequently, it is possible to stop the engine while preventing the reaction force from causing a sense of shock to the driver.

10 Claims, 17 Drawing Sheets

POWER OUTPUT DEVICE AND METHOD OF STOPPING PRIME MOVER IN THE POWER OUTPUT DEVICE

BACKGROUND OF THE INVENTION

The disclosure of Japanese Patent Application No. HEI 9-279586 filed on Sep. 25, 1997 including the specification, drawings and abstract is incorporated herein by reference in its entirety.

1. Field of Invention

The present invention relates to a power output device and a method of stopping a prime mover in the power output device and, more particularly, to a power output device controlling stoppage of the prime mover and a method related thereto.

2. Description of Related Art

Conventional vehicles or ships employ a power output device that includes a prime mover outputting power by means of fuel combustion and performs torque conversion to output a torque from the prime mover to a drive shaft. As such a power output device, a transmission combined with a fluid-type torque converter has been put into practice. The torque converter in this device is disposed between an output shaft of the prime mover and a rotational shaft coupled to the transmission and transmits power between both the shafts by transferring the fluid sealed in. This type of torque converter transmits power by means of fluid transfer, thereby generating a slippage between both the shafts, which causes a corresponding amount of energy loss. To be more precise, this energy loss is expressed as a product of a difference in of revolution speed between both the shafts and a torque transmitted to the output shaft, and is consumed as heat.

Thus, a vehicle equipped with such a power output device causes a problem of a large amount of energy loss in the torque converter, which leads to a low energy efficiency when the slippage between both the shafts becomes great, e.g. when the vehicle requires great power in taking off or in going up a slope at a low speed. Even in a steady running state, the power transmission efficiency in the torque converter does not reach 100%, so that a deterioration in fuel consumption is inevitable, e.g. in comparison with a manual transmission.

For this reason, some power output devices have already been proposed to replace the fluid-type torque converter. For example, the applicant proposed a power output device that is provided with a prime mover, a planetary gear constructed as a three-shaft type power input/output device, two electric motors and a battery (Japanese Patent Application Laid-Open No. SHO 50-30223). This power output device performs energy conversion of a power outputted from the prime mover and an electric power stored in the battery by means of the planetary gear and the two electric motors respectively, so as to output a desired power to a drive shaft. The applicant also proposed another power output device that is equipped with a prime mover, a planetary gear, two electric motors and a battery (secondary battery)(Japanese Patent Application Laid-Open No. HEI 10-98805, published Apr. 14, 1998). To stably output a desired power to a drive shaft, this power output device drive-controls the two electric motors such that the revolution speeds of three shafts constituting the planetary gear, i.e. a sun gear, a ring gear and a planetary carrier assume desired values respectively.

In these power output devices, the energy outputted from the prime mover is stored in the battery so that the thus-stored energy can be taken out whenever desired. Therefore, it is not absolutely necessary to maintain the balance between a power outputted to the drive shaft and a power outputted from the prime mover. On the contrary, what is desirable from the standpoint of an enhanced efficiency of the entire system is a construction wherein the prime mover is operated in a steady operating state that achieves a maximum efficiency, wherein if a surplus of energy exists relative to the power required for the drive shaft, that energy is stored as electric power and wherein if the battery is sufficiently charged, the prime mover is stopped so that the vehicle runs solely by means of power from the electric motors. In this case, the prime mover is intermittently operated.

However, it has been revealed by actually manufacturing a power output device having a torque conversion device interposed between the prime mover and the drive shaft that various problems are raised when the prime mover is intermittently operated. One of the problems is that torsional resonance may be caused due to a considerable weight of the torque conversion device coupled to the output shaft of the prime mover. It has also been revealed that the warm-up state of the prime mover or the like affects conditions for causing torsional resonance. Furthermore, the prime mover is connected with various peripheral devices including a catalytic converter. It has also been revealed that if the prime mover is operated or stopped independently of the states of those peripheral devices, some sort of inconvenience may be caused. For example, if the prime mover is stopped prior to completion of the warm-up process, the catalytic converter does not reach its activation temperature forever, which makes it inevitable to continue to drive the vehicle with an insufficient degree of exhaust gas purification.

In addition, the following problem has also been discovered. In the construction employing the planetary gear, part of the power outputted from the prime mover is directly outputted to the drive shaft via the planetary gear. Therefore, if fuel supply to the prime mover is cut off, the revolution speed of the output shaft of the prime mover also changes in accordance with a sudden change in the power outputted from the prime mover. Such a change in the revolution speed of the output shaft also affects the rotational shafts of the two electric motors via the planetary gear. The two electric motors are subjected to feedback control so as to eliminate a change in the revolution speed. However, since the power outputted from the prime mover changes earlier than the control of the electric motors, the drive shaft undergoes torque shock. The torque shock generated in the drive shaft is undesirable in terms of driving comfort.

Furthermore, the drive shaft of the vehicle may be coupled to other power control devices such as an antilock brake system (ABS) for preventing excessive slippage of wheels, a traction control system and the like. These control systems basically control driving forces applied to the wheels and provide the same effect as in the torque control of the drive shaft. Thus, from the standpoint of the control performed by the other power control devices, it is undesirable to cause fluctuations in a torque transmitted to the drive shaft by stopping the prime mover during such control. In this case, there arises a problem of control complication.

SUMMARY OF THE INVENTION

In addition to the aforementioned problems, many problems have been discovered in relation to the control for stopping the prime mover. It is thus an object of the present invention to solve these problems, to suitably perform the control for stopping the prime mover in the power output device, and to attenuate a torque shock that may be caused to the drive shaft upon stoppage of the prime mover.

To achieve at least part of the aforementioned object, a power output device of the present invention and a method of stopping a prime mover in the power output device have found a solution, which will now be described. That is, the power output device of the present invention includes a prime mover outputting power by means of fuel combustion, a torque controller interposed between an output shaft of the prime mover and a drive shaft and controlling torque outputted to the drive shaft, an electric motor capable of inputting/outputting power to/from the torque controller, a prime mover operating state determiner that determines an operating state of the prime mover based on demands imposed on the power output device and outputs an operation stop command to stop operation of the prime mover if it is determined that there is no need to continue operation of the prime mover, a stop condition determiner that determines whether or not a condition allowing stoppage of the prime mover is met, and a stop moment control executer that stops fuel supply to the prime mover, applies torque to the output shaft, adjusts rotational deceleration of the output shaft to a predetermined range and stops the prime mover if a command to stop the prime mover in operation is outputted from the prime mover operating state determiner and it is determined by the stop condition determiner that the condition allowing stoppage of the prime mover is met.

This power output device does not stop operation of the prime mover simply because the prime mover operating state determiner has determined that there is no need to continue operation of the prime mover. Instead, the stop condition determiner determines whether or not the condition allowing stoppage of the prime mover is met. Only if the condition allowing stoppage of the prime mover is met, the stop moment control of the prime mover is performed. The stop moment control of the prime mover adjusts rotational deceleration (acceleration with a minus sign) of the output shaft of the prime mover to a predetermined range and stops the prime mover, instead of simply suspending fuel supply to the prime mover.

As a result, if the prime mover does not affect the power output device and related devices, it is stopped after rapidly passing an operating area where the output shaft undergoes torsional resonance.

As the condition allowing stoppage of the prime mover, the warm-up state of the prime mover can be taken into account. If the warm-up process has not been completed, it is determined that the condition allowing stoppage of the prime mover is not met. Even when there is no need to continue operation of the prime mover in terms of the demands imposed on the power output device, the operation of the prime mover is continued unless the warm-up process of the prime mover has been completed. Therefore, it is possible to sufficiently warm up the catalytic converter, so that the exhaust gas purification performance never deteriorates. Furthermore, prior to completion of the warm-up process, the engine has insufficient lubricity and the prime mover undergoes considerable friction. Therefore, it may be difficult to adjust rotational deceleration of the output shaft of the engine to a predetermined range. However, since the engine is stopped after completion of the warm-up process, it is possible to stop the engine while adjusting the rotational deceleration to the predetermined range, and to avoid the problem of torsional resonance.

In the case where the aforementioned construction further includes a power controller coupled to the drive shaft, the stop condition determiner can be designed to determine that the condition allowing stoppage of the prime mover is not met if the power control device is in operation. In this case, the prime mover is not stopped while the power control device is in operation. Thus, there is no possibility of a power outputted to the drive shaft fluctuating to such an extent as to affect the operation of the power output device.

For example, as the power control device, it may be considered to use a slip prevention device that prevents excessive slippage of wheels. In this case, the stop condition determiner can be designed to determine that the aforementioned condition allowing stoppage of the prime mover is not met if the slip prevention device is in operation. Thus, while the slip prevention device is in operation to control torque values of the wheels, the prime mover is not stopped. Consequently, there is no possibility of the stoppage of the prime mover causing torque fluctuations to the drive shaft and adversely affecting the control of the slip prevention device.

On the other hand, there is also a case where the stop condition determiner actively determines that the condition allowing stoppage of the prime mover is met. If a condition allowing reduction of a reaction force that may be applied to the drive shaft upon stoppage of the prime mover is met, it should be determined that the prime mover can be stopped. For example, in the construction wherein the drive shaft is coupled to wheels and a brake device for braking the wheels, it is possible to determine that the condition allowing reduction of the reaction force is met, if the brake device is in operation. Since a braking force is applied to the drive shaft, it is possible to reduce the influences of the reaction force using that braking force.

It is also possible to provide a construction wherein the reaction force applied to the drive shaft is actively reduced. For example, the drive shaft is coupled to a second electric motor that is different from the aforementioned electric motor coupled to the torque controller. The second electric motor can be designed to reduce the reaction force applied to the drive shaft upon stoppage of the prime mover. In this case, the stop condition determiner can determine that the condition allowing reduction of the reaction force is met if the second electric motor is capable of outputting a torque that reduces the reaction force to the drive shaft. Although the second electric motor may be provided with a view to reducing the reaction force resulting from stoppage of the prime mover, it is also possible to assign an electric motor originally provided with a view to inputting/outputting power to/from the drive shaft. In such a case, the second electric motor may exclusively play its original role without operating to reduce the reaction force. Therefore, it is also desirable to determine whether or not the condition allowing stoppage of the prime mover is met, after detecting an operating state of the second electric motor.

Furthermore, in the case where the second electric motor is coupled to the drive shaft and causes the drive shaft to rotate in a direction opposite to the direction in which the output shaft of the prime mover rotates (e.g. the case where the power output device is mounted to a vehicle that is in retreat), it is possible to determine that the condition allowing stoppage of the prime mover is met.

In the aforementioned respective constructions, the torque controller can be designed as a three-shaft type power input/output device having three shafts to which the drive shaft, the output shaft and a rotational shaft of the electric motor are coupled respectively. When powers are inputted/outputted to/from two of the three shafts, the three-shaft type power input/output device inputs/outputs a power that is determined based on the inputted/outputted powers to/from the other shaft. A planetary gear device, a bevel gear device and the like are known as the three-shaft type input/output device. This construction makes it possible to couple the prime mover, the electric motor and the drive shaft to one another without making great efforts, and to control with a great degree of freedom powers inputted/outputted to/from the respective shafts under the aforementioned characteristics of the three-shaft type power input/output device. For example, it is possible to achieve a state where the drive shaft is driven with the prime mover operating as the only power source, a state where the drive shaft is driven with both the prime mover and the electric motor operating as power sources, a state where electric power is regenerated from the electric motor, a state where the prime mover is utilized as a brake device, and the like.

A method of stopping a prime mover according to the present invention relates to a power output device including a prime mover outputting power by means of fuel combustion, a torque controller interposed between an output shaft of the prime mover and a drive shaft and that controls torque outputted to the drive shaft, and an electric motor capable of inputting/outputting power to/from the torque controller. This method includes a first step of determining an operating state of the prime mover based on demands imposed on the power output device and determining whether or not it is necessary to continue operation of the prime mover, a second step of determining whether or not a condition allowing stoppage of the prime mover is met, and a third step of stopping fuel supply to the prime mover, applying torque to the output shaft, adjusting rotational deceleration of the output shaft to a predetermined range and performing stop moment control for stopping the prime mover if it is determined that there is no need to continue operation of the prime mover and that the condition allowing stoppage of the prime mover is met.

According to this method of stopping the prime mover in the power output device, if it is determined that there is no need to continue operation of the prime mover, it is then determined whether or not the condition allowing stoppage of the prime mover is met, instead of stopping operation of the prime mover immediately. In this method, the stop moment control of the prime mover is performed only if the condition allowing stoppage of the prime mover is met.

BRIEF DESCRIPTION OF THE DRAWINGS

The foregoing and further objects, features and advantages of the present invention will become apparent from the following description of preferred embodiments with reference to the accompanying drawings, wherein.

DETAILED DESCRIPTION OF PREFERRED EMBODIMENTS

Figure 1:
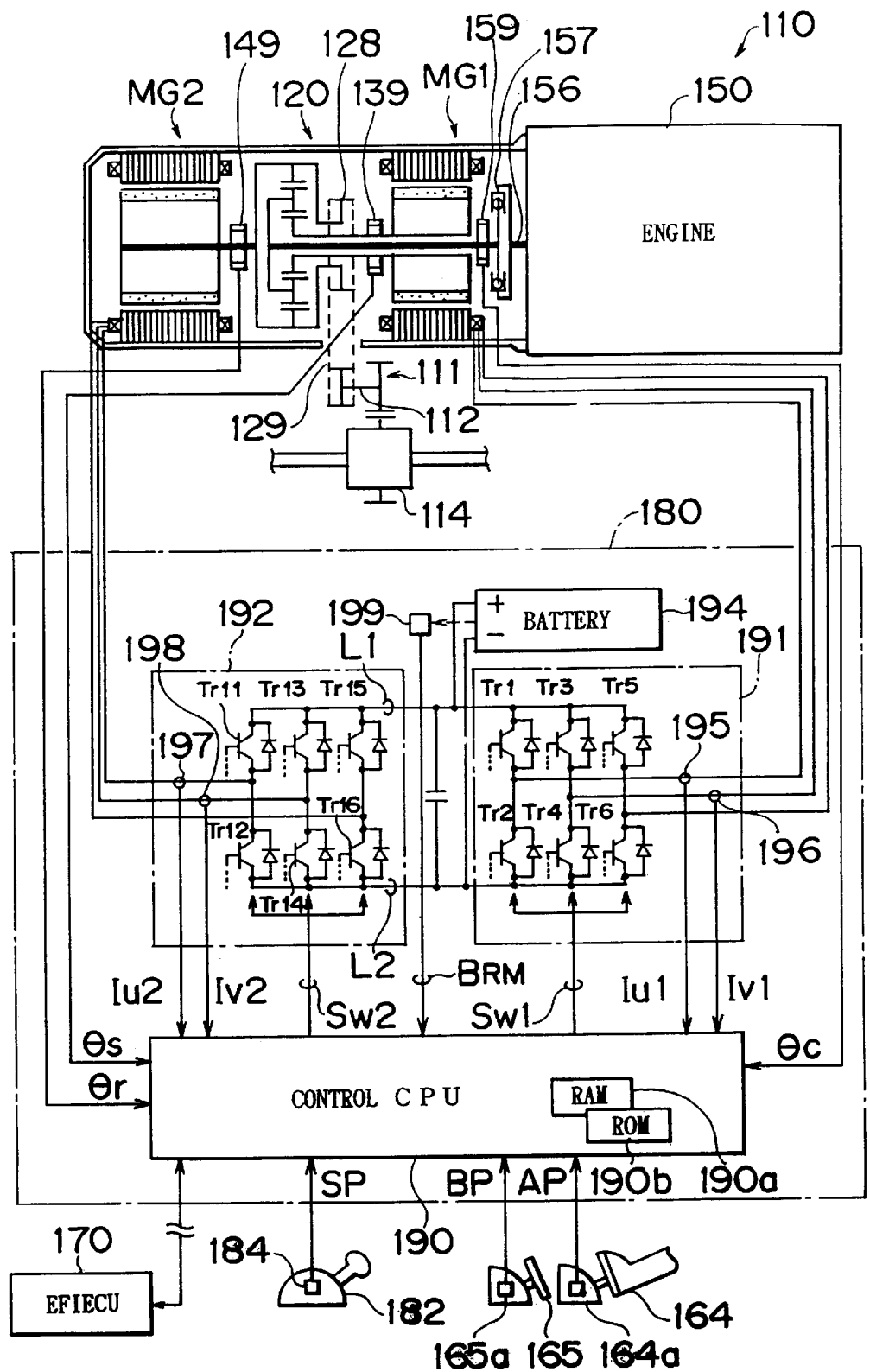
FIG. 1 is a schematic illustration of the overall structure of a power output device according to one embodiment of the present invention.
Figure 2:
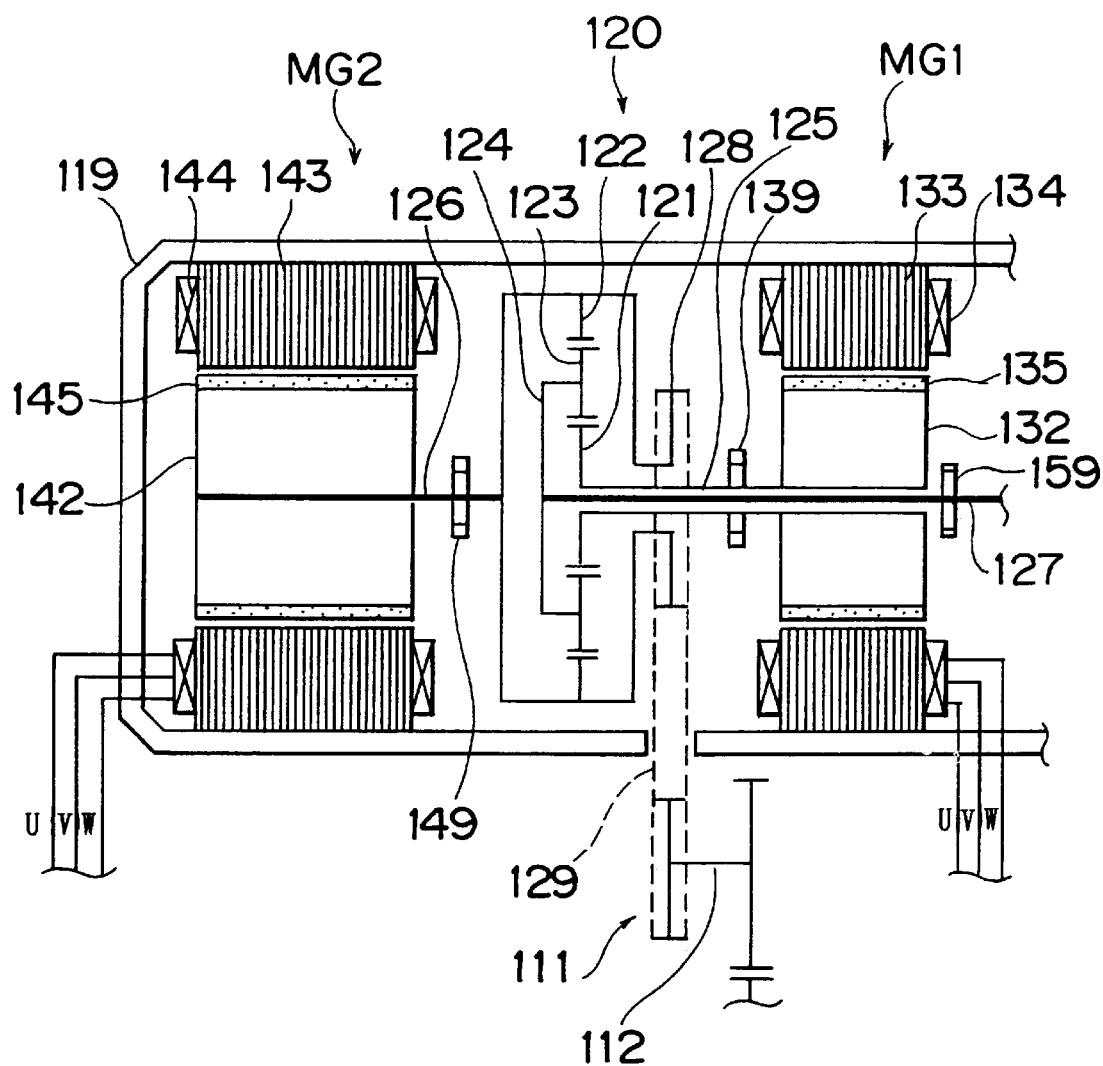
FIG. 2 is a partially enlarged view of the power output device according to the embodiment.
Figure 3:
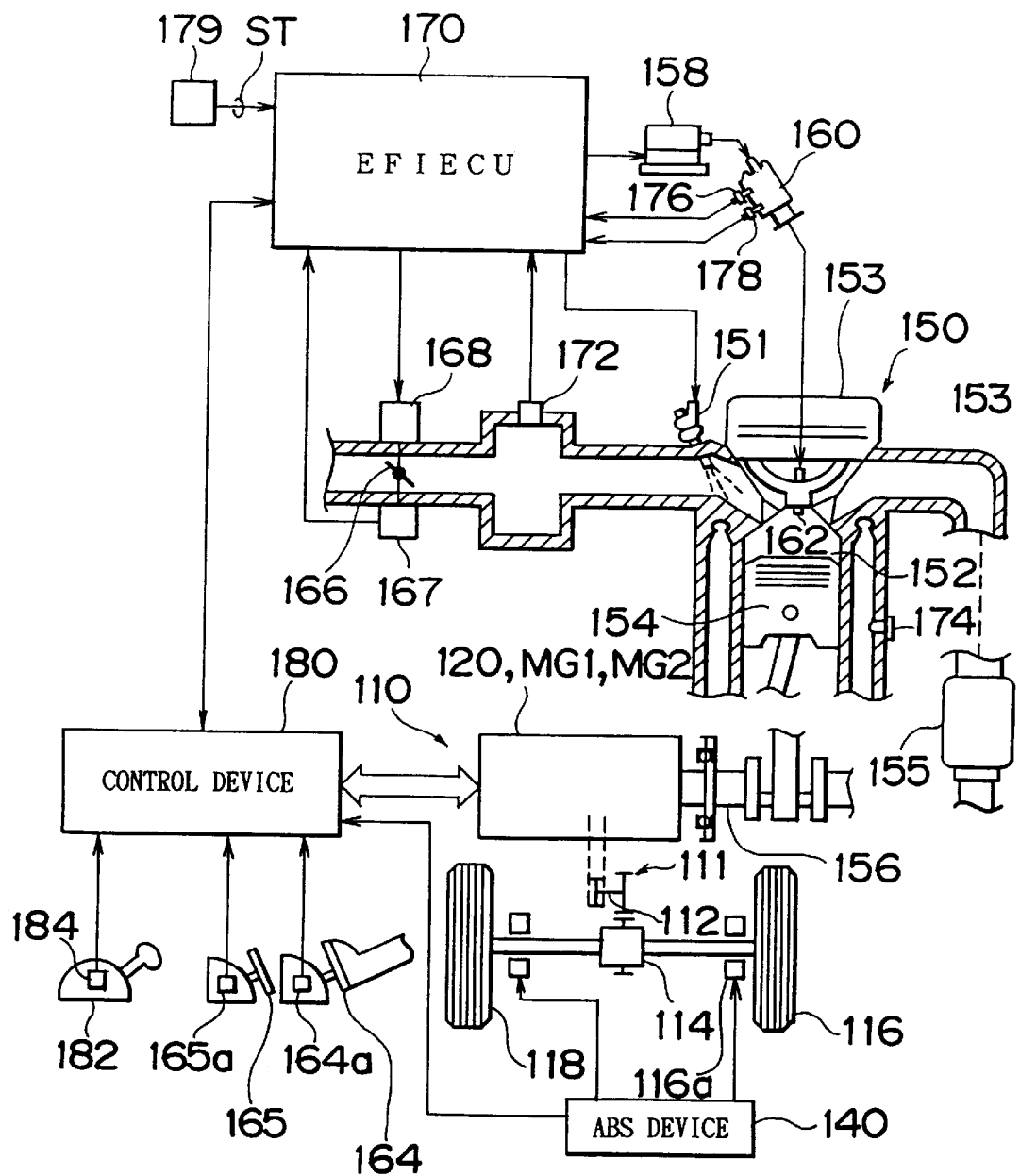
FIG. 3 is an example of the overall structure of a vehicle to which the power output device according to the embodiment is mounted.

Modes of carrying out the present invention will hereinafter be described based on embodiments thereof. FIG. 1 is a structural view schematically illustrating the structure of a power output device 110 according to one embodiment of the present invention. FIG. 2 is a partially enlarged view of the power output device 110 according to the embodiment. FIG. 3 is a structural view schematically illustrating the structure of a vehicle to which the power output device 110 according to the embodiment is mounted. For convenience of explanation, the entire structure of the vehicle will first be described with reference to FIG. 3.

As illustrated in FIG. 3, this vehicle is provided with an engine 150 that outputs power using gasoline as fuel. This engine 150 has a combustion chamber 152, into which the mixture of air sucked from an intake system through a throttle valve 166 and gasoline injected from a fuel injection valve 151 is sucked. Explosion of this mixture causes a downward movement of a piston 154, which movement is converted into a rotary movement of a crank shaft 156. The throttle valve 166 is driven to be opened or closed by an actuator 168. A high voltage from an igniter 158 is applied to an ignition plug 162 through a distributor 160. Due to the high voltage, the ignition plug 162 emits an electric spark at a predetermined timing. By being ignited by this electric spark, the mixture sucked into the combustion chamber 152 explodes and burns. The explosion and combustion of the mixture pushes the piston 154 downwards, thus causing the crank shaft 156 to rotate. After the combustion, the gas is discharged into an exhaust pipe 153 from an exhaust valve, purified by passing through a catalytic converter 155 and discharged into the atmosphere.

The operation of this engine 150 is controlled by an electronic fuel injection electronic control unit (hereinafter referred to as EFIECU) 170, with which various sensors indicating operating states of the engine 150 are connected. These sensors include, for example, a throttle valve position sensor 167 for detecting opening degree (position) of the throttle valve 166, an intake pipe negative pressure sensor 172 for detecting load applied to the engine 150, a coolant temperature sensor 174 for detecting coolant temperature of the engine 150, a revolution sensor 176 for detecting the revolution speed of the crank shaft 156, a rotational angle sensor 178 for detecting rotational angle of the crank shaft 156, and the like. The revolution sensor 176 and the rotational angle sensor 178 are provided on the distributor 160. Besides, components such as a starter switch 179 for detecting a state ST of an ignition key are connected with the EFECU 170. However, the other sensors, switches and the like are not shown in the accompanying drawings.

The crank shaft 156 of the engine 150 is coupled via a damper 157 to a planetary gear 120, a motor MG1 and a motor MG2, which will later be described. The damper 157 restricts the amplitude of torsional vibration caused by the crank shaft 156. The crank shaft 156 is further coupled to a differential gear 114 via a power transmission gear 111 that rotates upon a drive shaft 112. Accordingly, the power outputted from the power output device 110 is eventually transmitted to a left driving wheel 116 and a right driving wheel 118. The motor MG1 and the motor MG2 are electrically connected with a control device 180 and drive-controlled thereby. The drive control device 180 contains a control CPU and has connected therewith a shift position sensor 184 provided on a shift lever 182, an accelerator pedal position sensor 164*a* provided on an accelerator pedal 164, a brake pedal position sensor 165*a* provided on a brake pedal 165 and the like. The detailed construction of the drive control device 180 will later be described. Furthermore, the control device 180 exchanges various data with the EFIECU 170. The control including such exchange of data will later be described.

The driving wheels 116, 118 are provided with wheel cylinders 116*a*, 118*a* respectively, which apply braking forces to the driving wheels 116, 118 respectively. The wheel cylinders 116*a*, 118*a* are equipped with an ABS (Antilock Brake System) device 140, which reduces a hydraulic pressure that is supplied from a master wheel cylinder (not shown) linked to the brake pedal 165 in the event of wheel lock. If the ABS device 140 determines that an excessive slip ratio has resulted from wheel lock, it reduces brake fluid pressures applied to the wheel cylinders 116*a*, 118*a*, thus preventing the occurrence of wheel lock and ensuring controllability of the vehicle. The ABS device 140 outputs to the control device 180 a signal indicating whether or not the ABS control is being performed.

As illustrated in FIG. 1, the power output device 110 according to the embodiment is essentially composed of the engine 150, the damper 157 connecting the crank shaft 156 of the engine 150 with a carrier shaft 127 and restricting the amplitude of torsional vibration caused by the crank shaft 156, the planetary gear 120 having a planetary carrier 124 coupled to the carrier shaft 127, the motor MG1 coupled to a sun gear 121 of the planetary gear 120, the motor MG2 coupled to a ring gear 122 of the planetary gear 120, and the control device 180 that drive-controls the motors MG1, MG2.

The constructions of the planetary gear 120 and the motors MG1, MG2 will now be described with reference to FIG. 2. The planetary gear 120 is composed of the sun gear 121, the ring gear 122, a plurality of planetary pinion gears 123 and the planetary carrier 124. The sun gear 121 is coupled to a hollow sun gear shaft 125 whose axial center is penetrated by the carrier shaft 127. The ring gear 122 is coupled to a ring gear shaft 126 that is coaxial with the carrier shaft 127. The planetary pinion gears 123 are disposed between the sun gear 121 and the ring gear 122 and rotate while moving along the outer circumference of the sun gear 121. The planetary carrier 124 is coupled to an end of the crank shaft 156 and supports a rotational shaft of each of the planetary pinion gears 123. In this planetary gear 120, powers are inputted/outputted to/from three shafts, i.e. the sun gear shaft 125, the ring gear shaft 126 and the carrier shaft 127, which are coupled to the sun gear 121, the ring gear 122 and the planetary carrier 124 respectively. If the powers inputted/outputted to/from two of the three shafts are determined, the power inputted/outputted to/from the other shaft is determined based on the thus-determined powers inputted/outputted to/from the two shafts. The details of the powers inputted/outputted to/from the three shafts of the planetary gear 120 will later be described. The sun gear shaft 125, the ring gear shaft 126 and the carrier shaft 127 are provided with resolvers 139, 149 and 159, respectively. These resolvers 139, 149 and 159 detect rotational angles θs, θr and θc of the sun gear shaft 125, the ring gear shaft 126 and the carrier shaft 127, respectively.

A power takeout gear 128 for taking out power is coupled to the ring gear 122. The power takeout gear 128 is connected with the power transmission gear 111 by a chain belt 129, so that a power is transmitted between the power takeout gear 128 and the power transmission gear 111.

The motor MG1, which is designed as a synchronous motor generator, is provided with a rotor 132 and a stator 133. The rotor 132 has on an outer peripheral surface thereof a plurality of permanent magnets 135, and a three-phase coil 134 forming a revolving magnetic field is wound around the stator 133. The rotor 132 is coupled to the sun gear shaft 125, which is coupled to the sun gear 121 of the planetary gear 120. The stator 133 is formed by laminating thin plates made of non-oriented electromagnetic steel and secured to a case 119. The motor MG1 operates as an electric motor rotationally driving the rotor 132 due to the interaction of a magnetic field formed by the permanent magnets 135 with a magnetic field formed by the three-phase coil 134. The motor MG1 operates as a generator that generates an electromotive force at the both ends of the three-phase coil 134 due to the interaction of a magnetic field formed by the permanent magnets 135 with rotation of the rotor 132.

As is the case with the motor MG1, the motor MG2 is also designed as a synchronous motor generator and provided with a rotor 142 and a stator 143. The rotor 142 has on an outer peripheral surface thereof a plurality of permanent magnets 145, and a three-phase coil 144 forming a revolving magnetic field is wound around the stator 143. The rotor 142 is coupled to the ring gear shaft 126, which is coupled to the ring gear 122 of the planetary gear 120. The stator 143 is secured to the case 119. The stator 143 of the motor MG2 is also formed by laminating thin plates made of non-oriented electromagnetic steel. As is the case with the motor MG1, the motor MG2 also operates as an electric motor or a generator.

The control device 180 that drive-controls the motors MG1, MG2 will hereinafter be described. As illustrated in FIG. 1, the control device 180 is composed of a first drive circuit 191 driving the motor MG1, a second drive circuit 192 driving the motor MG2, a control CPU 190 controlling both the drive circuits 191, 192, and a battery 194 designed as a secondary battery. The control CPU 190 is a one-chip microprocessor and contains a RAM 190a for work, a ROM 190b having processing programs stored therein, input/output ports (not shown), and serial communication ports (not shown) for data communication with the EFIECU 170. The rotational angle θs of the sun gear shaft 125 obtained from the resolver 139, the rotational angle θr of the ring gear shaft 126 obtained from the resolver 149, the rotational angle θc of the carrier shaft 127 obtained from the resolver 159, the accelerator pedal position AP (the depression amount of the accelerator pedal) obtained from the accelerator pedal position sensor 164a, the brake pedal position BP (the depression amount of the brake pedal) obtained from the brake pedal position sensor 165a, the shift position SP obtained from the shift position sensor 184, the current values Iu1, Iv1 obtained from two current detectors 195, 196 incorporated in the first drive circuit 191, the current values Iu2, Iv2 obtained from two current detectors 197, 198 incorporated in the second drive circuit 192, the remaining capacity BRM obtained from a remaining capacity detector 199 for detecting remaining capacity of the battery 194, and the like are inputted into the control CPU 190 through the input ports.

The shift position sensor 184 detects current position (range) SP of the shift lever 182. The ranges provided in the vehicle of the present embodiment are a parking range (P), a neutral range (N), a reverse range (R), a driving range (D) and a brake range (B). Although the P, N, R and D ranges are the same as those provided in a conventional vehicle, the B range is special to the vehicle of the present embodiment. In comparison with the D range, the B range provides an increased effectiveness of regeneration brake at the time of deceleration. In the case where the motor vehicle goes down a slope, the B range makes it possible to obtain the same characteristics as in engine brake of the conventional vehicle, by utilizing the regeneration brake and actively promoting a regeneration process based on the motors MG1, MG2. At the time of acceleration, the B range provides the same characteristics as the D range.

As the remaining capacity detector 199 for detecting remaining capacity, a detector that measures either specific weight of the electrolytic solution of the battery 194 or weight of the entire battery 194, a detector that calculates current values and time periods during the charging and discharging processes, a detector that instantaneously short-circuits terminals of the battery to cause a current to flow and measures internal resistance, and the like are known.

The control CPU 190 outputs a control signal SW1 for driving six transistors Tr1 through Tr6 formed as switching elements incorporated in the first driving circuit 191 and a control signal SW2 for driving six transistors Tr11 through Tr16 formed as switching elements incorporated in the second driving circuit 192. The six transistors Tr1 through Tr6 in the first driving circuit 191 constitute a transistor inverter. The six transistors Tr1 through Tr6 are arranged in pairs such that one of the transistors of each pair is located on the source side and the other is located on the sink side. That is, one of the transistors of each pair is located on the side of a power line L1 and the other transistor is located on the side of a power line L2. Each connection point of each pair is connected with each of the three-phase coils (UVW) 134 of the motor MG1. The power lines L1, L2 are connected with the plus and minus sides of the battery 194 respectively. Accordingly, if the control CPU 190 outputs the control signal SW1 to sequentially control the on-time ratio of the transistors Tr1 through Tr6 arranged in pairs and performs PWM control to transform the waveform of the current flowing through each of the three-phase coils 134 into a pseudo-sinusoidal wave, the three-phase coils 134 form a revolving magnetic field.

On the other hand, the six transistors Tr11 through Tr16 in the second driving circuit 192 also constitute a transistor inverter and are arranged substantially in the same manner as those in the first driving circuit 191. Each connection point of the transistors of each pair is connected with each of the three-phase coils 144 of the motor MG2. Accordingly, if the control CPU 190 outputs the control signal SW2 to sequentially control the on-time ratio of the transistors Tr11 through Tr16 arranged in pairs and performs PWM control to transform the waveform of the current flowing through each of the three-phase coils 144 into a pseudo-sinusoidal wave, the three-phase coils 144 form a revolving magnetic field.

Figure 4:
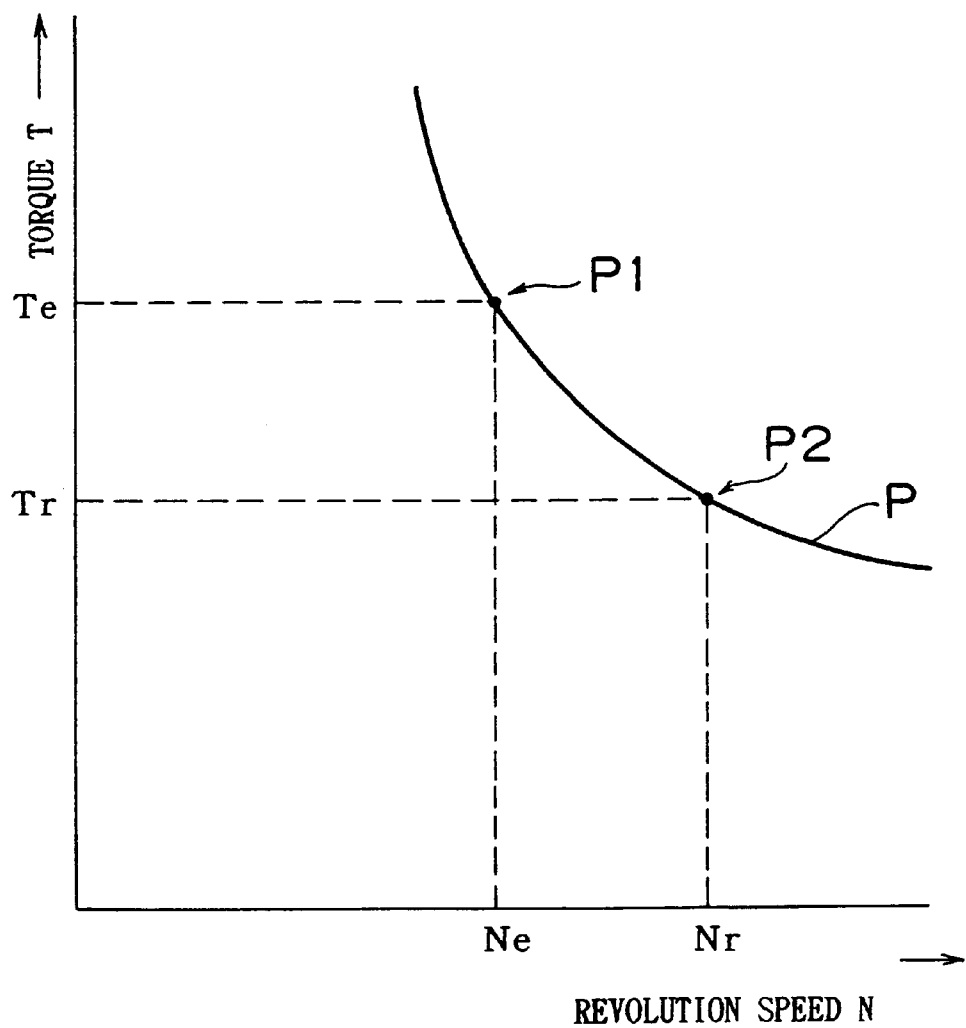
FIG. 4 is a graph for explaining the operation principle of the power output device 110.

The operation of the thus-constructed power output device 110 according to the embodiment will now be described. In the following description, the operation principle of the power output device according to the embodiment, especially the principle of torque conversion will be explained. What will be considered is a case where the engine 150 operates at an operating point P1 corresponding to the revolution speed Ne and torque Te and where the ring gear shaft 126 operates at an operating point P2 corresponding to the revolution speed Nr and torque Tr. Although the ring gear shaft 126 operates with the same amount of energy Pe as that outputted from the engine 150, the revolution speed Nr and the torque Tr are different from the revolution speed Ne and the torque Te respectively. In other words, what will be considered is a case where the power outputted from the engine 150 undergoes torque conversion and acts on the ring gear shaft 126. FIG. 4 illustrates the relationship among the revolution speeds and torque values of the engine 150 and the ring gear shaft 126 in this case.

Figure 5:
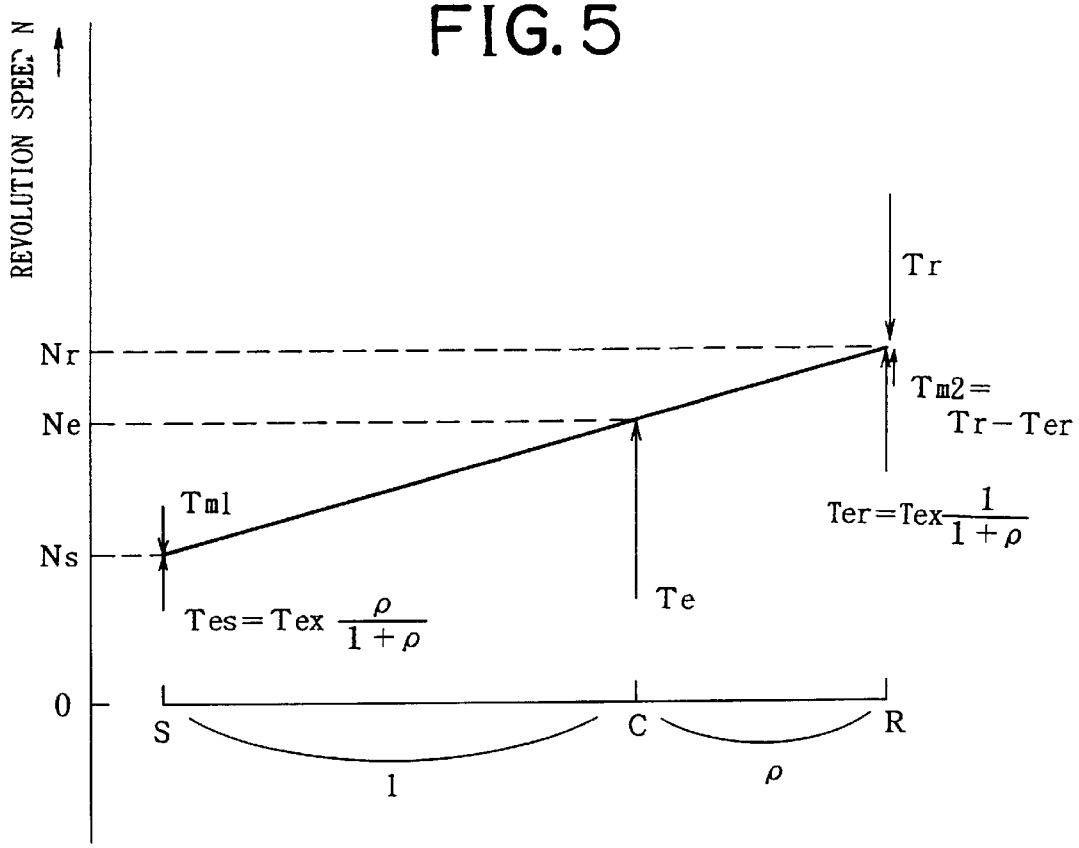
FIG. 5 is a collinear graph showing the relationship among the revolution speeds and torque values of three shafts coupled to a planetary gear.
Figure 6:
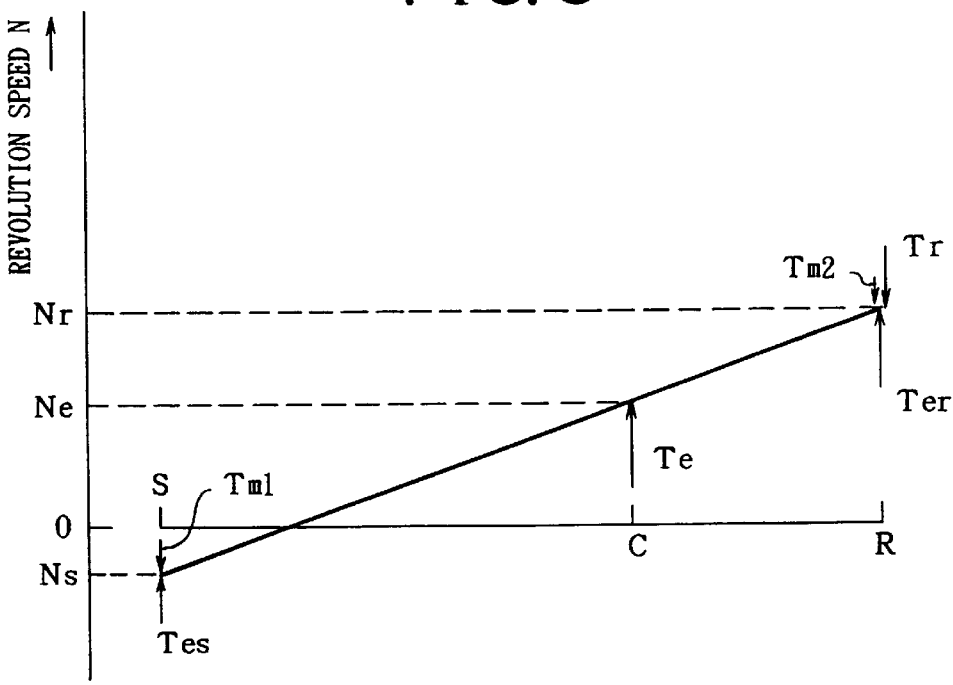
FIG. 6 is a collinear graph showing the relationship among the revolution speeds and torque values of the three shafts coupled to the planetary gear.

According to what mechanics teaches, the relationship among the revolution speeds and torque values of the three shafts of the planetary gear 120 (the sun gear shaft 125, the ring gear shaft 126 and the carrier shaft 127) can be represented in the form of a collinear graph as shown in FIGS. 5 and 6 and geometrically clarified. However, even in the case where the aforementioned collinear graphs are not available, the relationship among the revolution speeds and torque values of the three shafts of the planetary gear 120 can also be mathematically analyzed, e.g. by calculating the amounts of energy stored in the respective shafts. In the present embodiment, the collinear graphs will be used for convenience of explanation.

Referring to FIG. 5, the axis of ordinate represents the revolution speeds of the three shafts and the axis of abscissa represents positional ratios of coordinate axes of the three shafts. That is, when a coordinate axis S of the sun gear shaft 125 is located at one end and a coordinate axis R of the ring gear shaft 126 is located at the other end, a coordinate axis C of the carrier shaft 127 is defined as a shaft that interior-divides a line segment formed by the coordinate shafts S, R with the ratio of 1 p. p represents a ratio of the number of teeth of the sun gear 121 to the number of teeth of the ring gear 122, as is apparent from a formula (1) shown below.

$$\rho = (\text{number of sun gear teeth})/(\text{number of ring gear teeth}) \qquad (1)$$

What is considered herein is a case where the engine is operated at the revolution speed Ne and the ring gear shaft 126 is operated at the revolution speed Nr. Therefore, it is possible to plot the revolution speed Ne of the engine 150 onto the coordinate axis C of the carrier shaft 127 to which the crank shaft 156 of the engine 150 is coupled, and to plot the revolution speed Nr onto the coordinate axis R of the ring gear shaft 126. By drawing a line passing through both the plotted points, it is possible to obtain the revolution speed Ns of the sun gear shaft 125. That is, the revolution speed Ns is represented by an intersection point of the line with the coordinate axis S. The line will hereinafter be referred to as an operational co-line. The revolution speed Ns can be obtained from a proportional calculation formula (a formula (2) shown below), using the revolution speed Ne and the revolution speed Nr. Thus, if the revolution speeds are determined with respect to two of the sun gear 121, the ring gear 122 and the planetary carrier 124, which altogether constitute the planetary gear 120, the revolution speed of the other constituent of the planetary gear 120 is determined based on the already-determined revolution speeds of the two constituents of the planetary gear 120.

$$Ns = Nr - (Nr - Ne)\frac{1+\rho}{\rho} \quad (2)$$

Subsequently, the torque Te of the engine 150 is applied to the thus-drawn operational co-line in the bottom-to-top direction in FIG. 5, with the coordinate axis C of the carrier shaft 127 acting as a line of action. In this case, against the torque Te, the operational co-line can be treated as a rigid body to which a vectorial force is applied. Therefore, the torque Te applied to the coordinate axis C can be divided into torque Tes applied to the coordinate axis S and torque Ter applied to the coordinate axis R, making use of a method of dividing a force into components that act along two different parallel lines of action. In this case, the torque values Tes, Ter are represented by a formula (3) shown below. In the following description wherein the collinear graphs are used, the respective torque values Tes, Te, Ter and Tr are all regarded as positive regardless of their directions of application. In other words, the absolute values of these torque values are used. On the other hand, the torque values Tm1, Tm2, which require subtraction, are treated as they are. Accordingly, the torque Tm1 assumes a positive value if applied downwards, and the torque Tm2 assumes a positive value if applied upwards. Consequently, in the collinear graphs, the torque Tm2 is applied upwards if Tr−Ter>0, and it is applied downwards if Tr−Ter<0. The directions in which the torque Tm1 and the torque Tm2 are applied have nothing to do with whether the motors MG1, MG2 are in the process of regenerating electric power or consuming electric power (being driven). As will later be described, the states of the motors MG1, MG2 (regeneration or drive) are determined depending on whether the torque Tm1 and the torque Tm2 act to increase or decrease the revolution speeds of the shafts to which the torque Tm1 and the torque Tm2 are applied respectively.

$$Tes = Te \times \frac{\rho}{1+\rho} \quad (3)$$
$$Ter = Te \times \frac{1}{1+\rho}$$

To stabilize the operational co-line in this state, the forces applied thereto should be evenly balanced. That is, the torque Tm1 is applied to the coordinate axis S and the torque Tm2 is applied to the coordinate axis R. The torque Tm1 is as large as the torque Tes but acts in the direction opposite to the torque Tes. The torque Ter is outputted to the ring gear shaft 126. It is assumed herein that a torque that is as large as the torque Tr but acts in the direction opposite to the torque Tr forms together with the torque Ter a resultant force. The torque Tm2 is as large as the resultant force but acts in the direction opposite to the resultant force. The torque Tm1 can be applied by the motor MG1 and the torque Tm2 can be applied by the motor MG2. In this case, the motor MG1 applies torque in the direction opposite to a rotational direction thereof. Thus, the motor MG1 operates as a generator and regenerates electric energy Pm1 from the sun gear shaft 125. The electric energy Pm1 is represented as the product of the torque Tm1 and the revolution speed Ns. The motor MG2 applies torque in the same direction as a rotational direction thereof. Thus, the motor MG2 operates as an electric motor and outputs electric energy Pm2 to the ring gear shaft 120 as motive power. The electric energy Pm2 is represented as the product of the torque Tm2 and the revolution speed Nr.

If the electric energy Pm1 is equal to the electric energy Pm2, the motor MG1 can regenerate all the energy consumed by the motor MG2. For this purpose, it is required that all the inputted energy be outputted. Thus, the energy Pe outputted from the engine 150 should be equalized with the energy Pr outputted to the ring gear shaft 126. In other words, the energy Pe represented as the product of the torque Te and the revolution speed Ne should be equalized with the energy Pr represented as the product of the torque Tr and the revolution speed Nr. Referring to FIG. 4, the power, which is represented by the torque Te outputted from the engine 150 operated at the operating point P1 and the revolution speed Ne, is subjected to torque conversion and outputted to the ring gear shaft 126 as the power represented by the torque Tr and the revolution speed Nr. In this case, the amount of energy remains the same. As described earlier, the power outputted to the ring gear shaft 126 is transmitted to the drive shaft 112 by the power takeout gear 128 and the power transmission gear 111 and is further transmitted to the driving wheels 116, 118 via the differential gear 114. Accordingly, there is a linear relationship established between the power outputted to the ring gear shaft 126 and the power transmitted to the driving wheels 116, 118. Therefore, it is possible to control the power transmitted to the driving wheels 116, 118 by controlling the power outputted to the ring gear shaft 126.

Referring to the collinear graph in FIG. 5, the revolution speed Ns of the sun gear shaft 125 assumes a positive value. However, depending on the revolution speed Ne of the engine 150 and the revolution speed Nr of the ring gear shaft 126, the revolution speed Ns of the sun gear shaft 125 may assume a negative value, as indicated by the collinear graph in FIG. 6. In this case, the motor MG1 applies torque in the same direction as a rotational direction thereof. Thus, the motor MG1 operates as an electric motor and consumes the electric energy Pm1 represented as the product of the torque Tm1 and the revolution speed Ns. On the other hand, the motor MG2 applies torque in the direction opposite to a rotational direction thereof. Thus, the motor MG2 operates as a generator and regenerates the electric energy Pm2, which is represented as the product of the torque Tm2 and the revolution speed Nr from the ring gear shaft 126. In this case, if the electric energy Pm1 consumed by the motor MG1 is equal to the electric energy Pm2 regenerated by the motor MG2, the motor MG2 can exactly compensate for the electric energy Pm1 consumed by the motor MG1.

The basic torque conversion in the power output device 110 according to the embodiment has hereinbefore been described. However, in addition to the operation wherein all the energy outputted from the engine 150 undergoes torque conversion to be outputted to the ring gear shaft 126, the power output device 110 according to the embodiment can perform various operations. By adjusting the power outputted from the engine 150 (the product of the torque Te and the revolution speed Ne), the electric energy Pm1 consumed or regenerated by the motor MG 1, and the electric energy Pm2 consumed or regenerated by the motor MG2, the power output device 110 discharges a surplus of electric energy from the battery 194 or compensates for a deficiency of electric energy using the electric power stored in the battery 194.

The aforementioned operation principle has been described on the assumption that the power conversion efficiency of the planetary gear 120, the motor MG1, the motor MG2 and the transistors Tr1 through Tr16 is 1 (100%). In fact, the power conversion efficiency is less than 1. Therefore, it is necessary to make the energy Pe outputted from the engine 150 slightly larger or slightly smaller than the energy Pr outputted to the ring gear shaft 126. For example, the energy Pe outputted from the engine 150 is set to a value obtained by multiplying the energy Pr outputted to the ring gear shaft 126 by an inverse of the conversion efficiency. In the state as shown in the collinear graph in FIG. 5, the torque Tm2 of the motor MG2 is set to a value obtained by multiplying the electric power regenerated by the motor MG1 by the efficiency values of both the motors. In the state as shown in the collinear graph in FIG. 6, the torque Tm2 of the motor MG2 is set to a value obtained by dividing the electric energy consumed by the motor MG1 by the efficiency values of both the motors. Although the planetary gear 120 loses energy as heat due to mechanical friction, the amount of energy loss is generally quite small. Thus, the efficiency values of the synchronous motor generators employed as the motors MG1, MG2 are quite close to 1. Furthermore, the on-resistance of the transistors Tr1 through Tr16, including those known as GTO, is also considerably small. Accordingly, the power conversion efficiency becomes approximate to 1. For convenience of explanation, the following description will be given on the assumption that the power conversion efficiency is 1 (100%) if there is no indication of any specific value.

Figure 7:
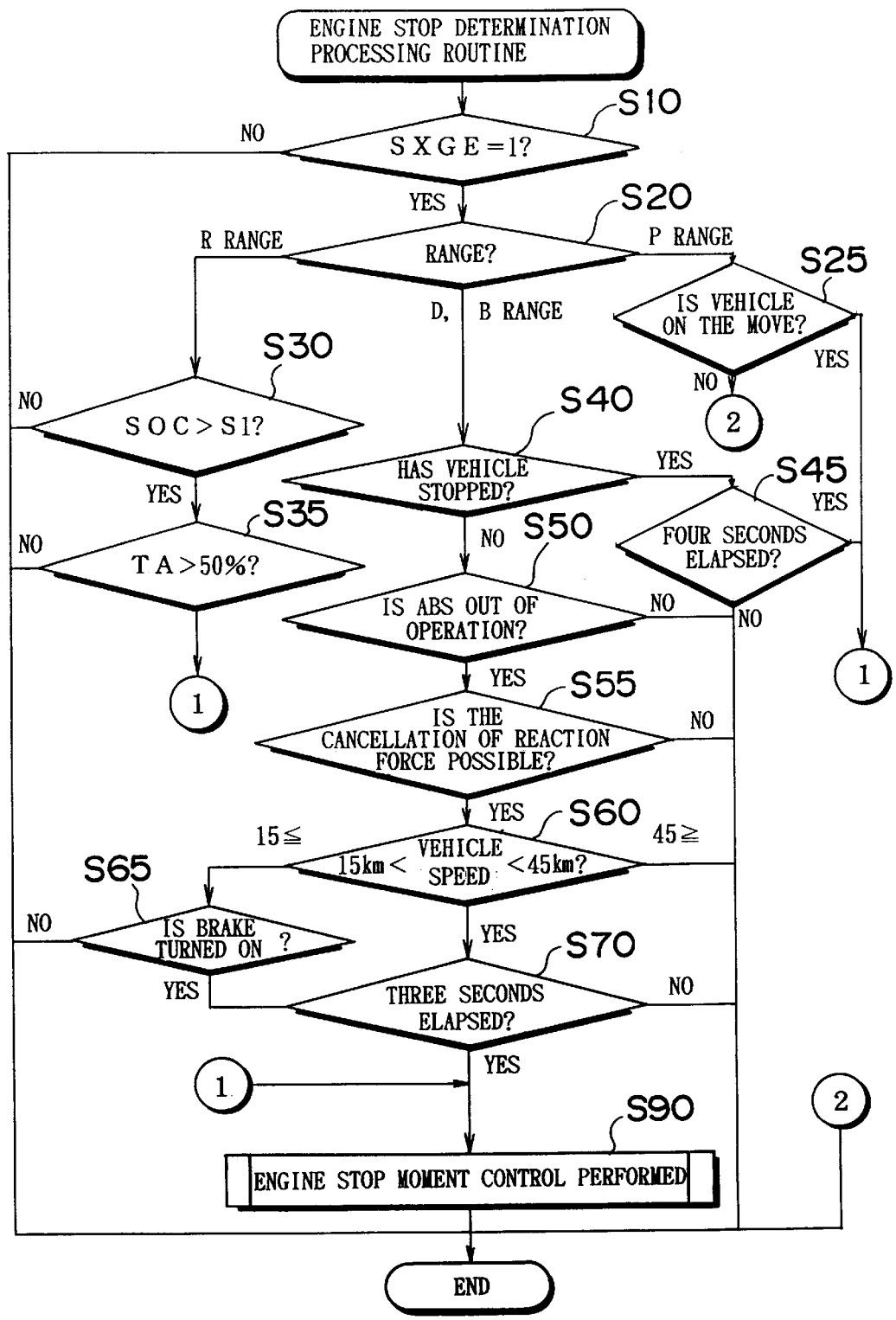
FIG. 7 is a flowchart showing an engine stop determination processing routine according to the embodiment.

A determination routine for stopping operation of the engine 150 while the vehicle is in a running state due to the aforementioned torque control will hereinafter be described with reference to FIG. 7. Upon start of this routine, a processing for checking the value of an engine stoppage enabling flag SXEG is first performed (step S10). This flag indicates whether or not the engine 150 should be stopped in view of the demands imposed on the engine 150. This flag is set by the control device 180 in another routine which is not shown. Then, if the sum Pe of the energy Pd necessary for the running operation of the vehicle and the energy Pb required for charging or discharging the battery 194 becomes smaller than a predetermined criterion value, it is determined that for the time being, there is no need to operate the engine 150 to output energy to the output shaft thereof. Thus, the control device 180 sets the engine stoppage enabling flag SXEG to 1. On the other hand, if the sum of the energy Pd necessary for the running operation of the vehicle and the energy Pb required for charging or discharging the battery 194 becomes larger than the predetermined value, the flag SXEG is set to 0, so that the engine 150 is started to continue the operation.

Unless the flag SXEG is set to 1, there is no need to stop the engine 150. Thus, the operation proceeds to the "END" and the routine is temporarily terminated. If the flag SXEG is set to 1, it is determined that the engine 150 can be stopped from the standpoint of energy balance, and the stop conditions are determined in the steps following step S20. In the steps following step S20, even if the engine 150 can be stopped from the standpoint of energy balance, there is a case where the engine 150 cannot be stopped in consideration of the entire vehicle. Therefore, in view of the power output device 110 and components related thereto, it is determined whether a condition allowing stoppage of the engine 150 is met. A series of processings described hereinbefore correspond to stop condition determiner.

If the flag SXEG is set to 1, a processing for determining the current shift range is performed (step S20). The shift range of the vehicle can be determined based on signals from the shift position sensor 184 of the shift lever 182. If it is indicated that the shift position SP is in the parking (P) range, signals are read out from the resolver 149 to perform a processing of determining whether or not the vehicle is on the move (step S25). Basically, the vehicle should not run in the P range. Therefore, in the case where the drive shaft 112 rotates in the P range, there may be some sort of inconvenience such as a failure in the P range lock occurring. In such a case, it is desired that the engine 150 that applies a forward moving force to the vehicle be stopped immediately. In this case, therefore, an engine stop moment processing (later-described step S90) is performed to stop the engine 150. Since this case intrinsically tends to cause some sort of inconvenience, it is also possible to stop the engine 150 immediately without performing the engine stop moment processing in step S90. In such a case, it is also preferable to indicate a state of abnormality to the driver after stoppage of the engine 150.

In the case where the shift range of the shift lever 182 is the reverse (R) range, it is determined whether or not the charge amount SOC of the battery 194 exceeds a predetermined value S1 (about 45% in this embodiment) (step S30). Furthermore, the opening degree TA of the throttle valve 166 is read out from the throttle valve position sensor 167. It is then determined whether or not the opening degree TA of the throttle valve 166 exceeds 50% (step S35). If the SOC exceeds the predetermined value S1 and the opening degree TA of the throttle valve 166 exceeds 50%, it is determined that the engine 150 should be stopped. The operation then proceeds to step S90 to perform engine stop moment control. Unless the SOC exceeds the predetermined value S1 or unless the opening degree TA of the throttle valve 166 exceeds 50%, it is determined that the engine 150 should not be stopped. The operation then proceeds to the "END" and the routine is temporarily terminated. Such determination allows the engine 150 to be stopped in the case where the battery 194 is charged to a certain extent and where a large driving force is required in retreating on a slope. If the engine 150 is in operation in the case where a large driving force is required, torque necessary for retreat may not be outputted to the drive shaft 112. Accordingly, in such a case, the engine 150 is stopped immediately. On the other hand, if the SOC is small, priority is assigned to the process of charging the battery 194 and the engine 150 is not stopped.

If it is determined that the shift position is in the drive range (D) or the brake range (B), it is determined whether or not the vehicle is stopped (step S40). If it is determined that the vehicle is stopped, it is then determined whether or not four seconds have elapsed after stoppage of the vehicle (step S45). If the flag SXEG is set to 1 and the vehicle is stopped in the D, B ranges, it is intrinsically possible to stop the engine 150. However, in the case where the vehicle is repeatedly started and stopped, for example, in a traffic jam, the engine 150 tends to be started at the time of the start of the vehicle. Thus, if the engine 150 is stopped immediately simply because the vehicle has been stopped, the engine 150 is turned on and off every time the vehicle is started and stopped respectively. As a result, the driver may find the turning on and off of the engine 150 too frequent. In the present embodiment, it is determined that the engine 150 can be stopped only if four seconds have elapsed after stoppage of the vehicle, so that the driver does not find the turning on and off of the engine 150 too frequent. If four seconds have elapsed after stoppage of the vehicle, it is determined that the engine 150 should be stopped, and the operation proceeds to step S90.

On the other hand, if the vehicle is not stopped, it is determined whether or not the ABS device 140 is out of operation (step S50). In the case where the vehicle is braked by depressing the brake pedal 165, the ABS device 140 controls brake fluid pressure to prevent the driving wheels 116, 118 from being locked due to an excessive brake pressure. During operation, the ABS device 140 outputs a signal indicative of its operating state to the control device 180. By reading the signal, the control device 180 can determine whether or not the ABS device 140 is in operation. If the ABS device 140 is in operation, the braking force applied to the drive shaft 112 is controlled. Therefore, it is determined that it is undesirable to stop the engine 150 to change the torque outputted to the drive shaft 112. Thus, the engine 150 is not stopped. In this case, the operation proceeds to the "END" and this routine is temporarily terminated.

On the other hand, if the ABS device 140 is out of operation, it is then determined whether or not the cancellation of reaction force is possible (step S55). The cancellation of reaction force means the act of canceling fluctuations (an abrupt decrease) in the torque applied to the drive shaft 112 upon stoppage of the engine 150 using the torque outputted from the motor MG2. In the case where the engine 150 is stopped, if fluctuations in the torque applied to the drive shaft 112 cannot be cancelled, the driver may notice torque shock upon stoppage of the engine 150. Accordingly, the stoppage of the engine 150 requires that torque fluctuations be cancellable. In the case where the motor MG2 regenerates electric power and operates as a regeneration brake, the torque command value of the motor MG2 may be limited in a predetermined manner depending on demands from voltage, regeneration current and the like. In such a case, it is impossible to cancel reaction force by changing the torque command value of the motor MG2. Thus, the lower guard value of the motor MG2 is modified to obtain a predetermined value TSTP by taking a margin for canceling reaction force into account. If the torque command value of the motor MG2 is larger than the predetermined value TSTP, it is determined that the cancellation of reaction force is possible. The predetermined value TSTP has been obtained using the following formula:

TSTP=TLG−1.2×ρ×TSD, wherein:

TLG represents the lower guard value of the motor MG2 obtained from power limit; ρ represents gear ratio of the planetary gear 120; and TSD represents pull-down torque for the cancellation of reaction force (−14Nm in the present embodiment).

It is to be noted herein that the coefficient of 1.2 has been used to ensure safety.

If it is determined that the cancellation of reaction force is possible, a processing for checking vehicle speed is then performed (step S60). If the vehicle speed is between 15 km/h and 45 km/h, it is determined that the driver does not become too sensitive to torque fluctuations due to the aforementioned reaction force cancellation control or the like even upon stoppage of the engine 150. If more than three seconds have elapsed after stoppage of the engine 150 (step S70), the stop moment control of the engine 150 is performed (step S90). It is because the control for stopping the engine 150 should not be performed too frequently that it is determined whether or not more than three seconds have elapsed. On the other hand, if the vehicle speed is less than or equal to 15 km/h, it is determined whether or not the brake is turned on (step S65). When the vehicle speed is low, the driver may notice fluctuations in the torque applied to the drive shaft 112 due to the stoppage of the engine 150, even if the reaction force cancellation control has been performed. However, if the brake is operated to apply a braking force to the drive shaft 112, the brake serves to cancel reaction force, and it is determined that the engine 150 can be stopped. Thus, the engine stop moment control is performed (step S90).

Figure 8:
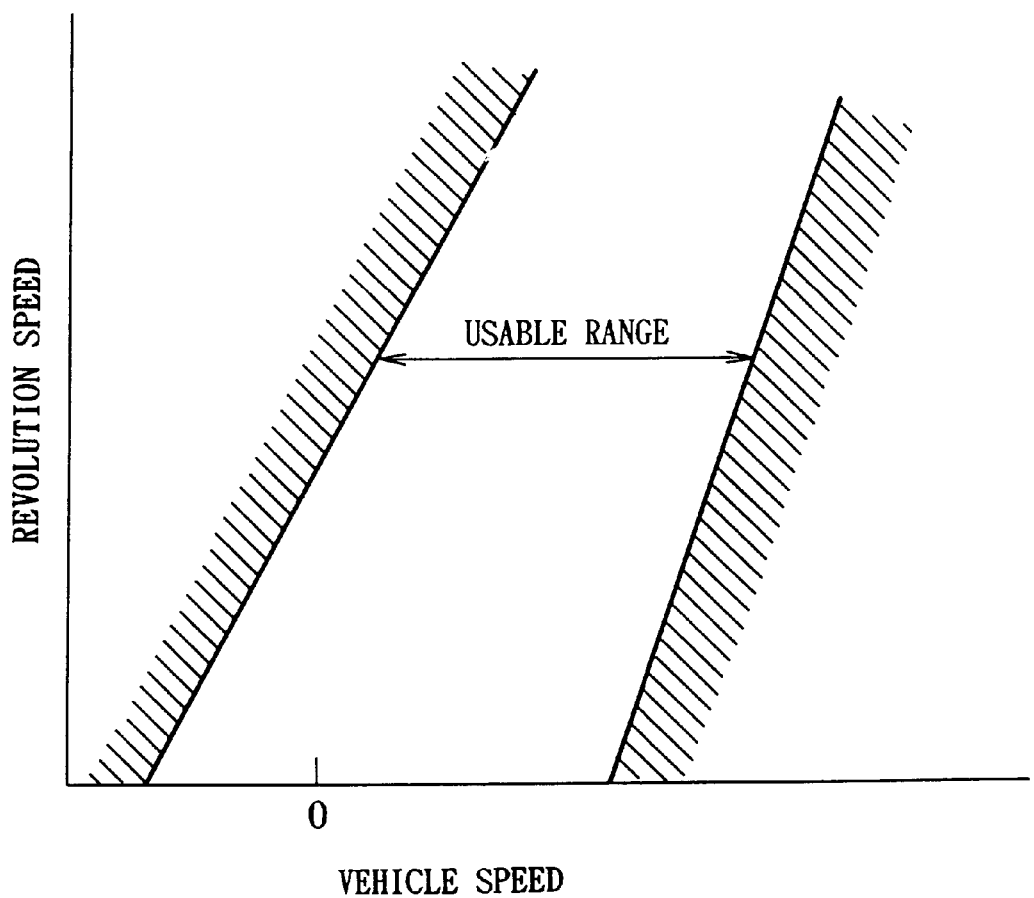
FIG. 8 is a view for explaining differential speed limit in a system according to the embodiment.

In the case where the determinations made in steps S40 and S50 give the negative results and in the case where the vehicle speed is judged to be greater than or equal to 45 km/h, it is determined that the condition allowing stoppage of the engine 150 is not met. The operation then proceeds to the "END" and this routine is temporarily terminated. Although not shown in FIG. 7, the engine 150 is stopped in the present embodiment if the shift position SP is in a range other than the N range, even in the case where it is impossible to observe a differential speed limit. The differential speed limit results from limitations imposed on the revolution speeds of the respective shafts of the planetary gear 120, to which the engine 150 and the two motors MG1, MG2 are coupled. It is already described that the operation of the planetary gear 120 can be represented in the form of a collinear graph (See FIGS. 5 and 6). If the revolution speeds of two of the shafts constituting the planetary gear 120 are determined, the revolution speed of the other shaft is automatically determined. The revolution speed of the sun gear 121 and the ring gear 122 have their respective upper limit values. Therefore, if the revolution speed of the drive shaft 112, i.e. the ring gear 122 is determined based on the vehicle speed, the engine 150 can be operated only within such a range that the revolution speed of the motor MG1, i.e. the sun gear 121 does not exceed its upper limit value. Thus, in the case where the revolution speed of the engine 150 becomes less than the autonomous revolution speed thereof (about 800 rpm in the present embodiment) due to the differential speed limit, the engine 150 is stopped. Since the motor MG1 is shut down in the N range, such conditions do not exist. FIG. 8 illustrates the area of differential speed limit.

According to the embodiment described hereinbefore, the stop moment control of the engine 150 is performed under the following conditions on the premise that the general condition allowing stoppage of the engine 150 is met from the standpoint of the charge state of the battery 194 (SXEG=1).

(1) If the vehicle moves when the shift position SP is in the P range, the stop moment control of the engine 150 is performed to stop the engine 150. The vehicle does not move intrinsically in the P range. Therefore, if the vehicle moves, it is determined that there is some sort of inconvenience caused. For this reason, the engine 150, which is a power source for driving the vehicle forwards, is stopped.

(2) When the shift position SP is in the R range, the control for stopping the engine 150 is performed if the SOC is more than a predetermined value and the throttle opening degree TA is more than 50%. In the case where one of the wheels is in retreat and a large torque is required in going up a slope in retreat, the engine 150 is stopped. When the vehicle retreats, the engine 150 generates torque applied in the direction opposite to a running direction of the vehicle. In the case where the drive shaft 112 necessitates torque exceeding a predetermined value, if the engine 150 is in operation, it may be impossible to apply necessary torque to the drive shaft 112. This is why the engine 150 is stopped. By stopping the engine 150, the power outputted from the motor MG2 that is driven with the electric power from the battery 194 can be directly used to drive the vehicle backwards.

It is to be noted herein that the value of the SOC is monitored. If the charge level of the battery 194 is low, the prevention of excessive discharge of the battery 194 has precedence over the retreat of the vehicle. Therefore, the engine 150 is not stopped.

(3) In the D or B range, if more than four seconds have elapsed after stoppage of the vehicle, the stop moment control of the engine 150 is performed. This is because the engine 150 can be stopped if the vehicle is stopped.

(4) In the D or B range, if
  i) the ABS device 140 is out of operation;
  ii) the cancellation of reaction force by the motor MG2 is possible; and
  iii) the vehicle speed is in a range from 15 km/h to 45 km/h, the control for stopping the engine 150 is performed. If all the conditions i) to iii) are met, there is no possibility that the ABS device 140 affects slip ratio control or that the driver notices torque shock upon stoppage of the engine. This is why the engine 150 is stopped.

In the case where the vehicle speed is lower than 15 km/h, if the brake is turned on, the engine 150 is stopped. This is because the braking force obtained from the brake can eliminate the torque shock caused upon stoppage of the engine 150.

In accordance with the processings described hereinbefore, it is determined whether or not the engine 150 can be stopped. The engine stop moment processing (step S90), which is performed when it is determined that the engine can be stopped, will be described with reference to an engine stop control routine shown in FIG. 9 as an example. The engine stop control routine may perform whatever control, as long as it brings the prime mover into a stopped state while limiting the rotational deceleration of the drive shaft within a predetermined range. It is because the torsional resonance area should be passed rapidly that the rotational deceleration of the drive shaft is limited within a predetermined range.

Figure 9:
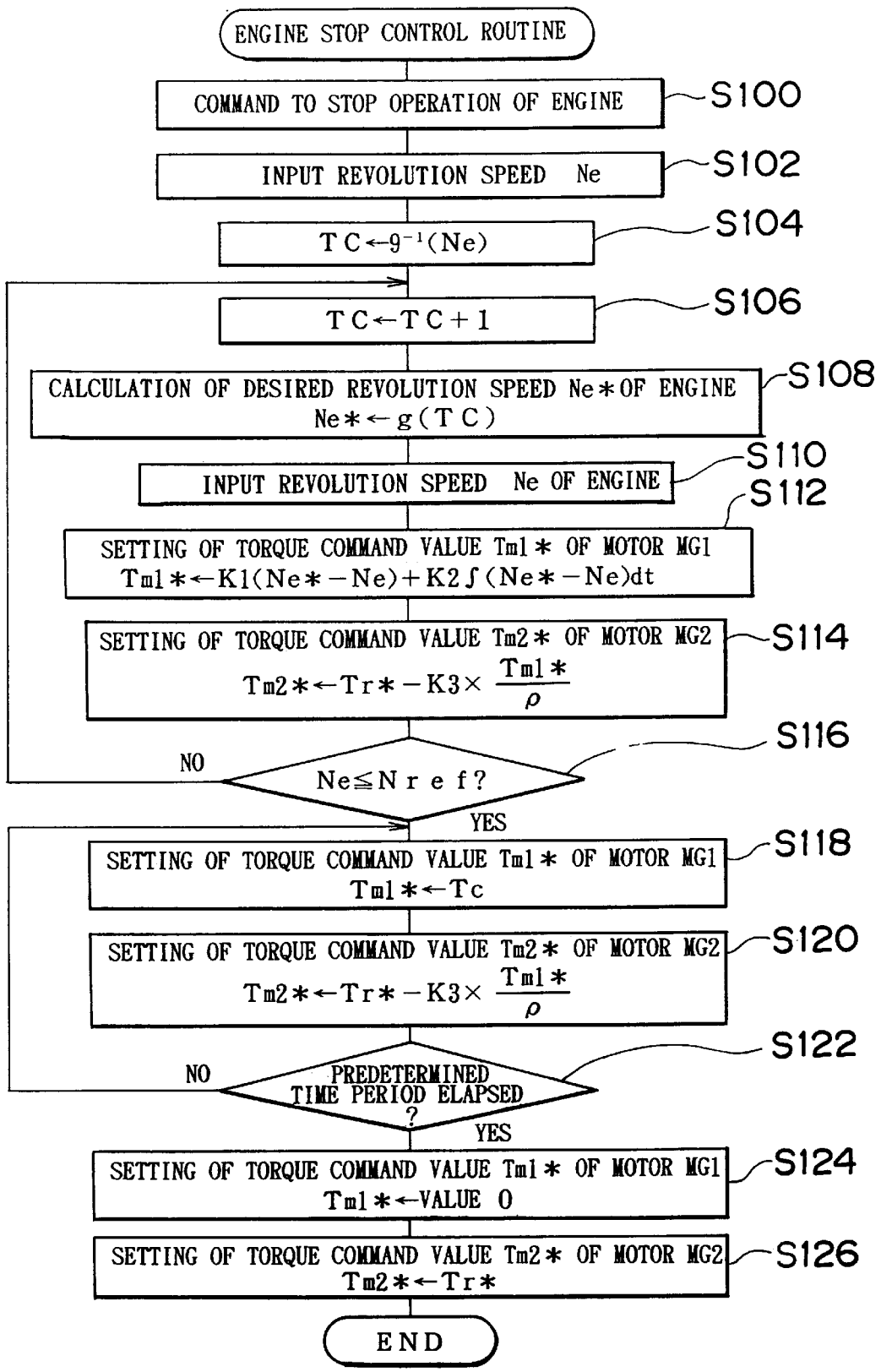
FIG. 9 is a flowchart showing an example of an engine stop control routine executed by a control device.

When the engine stop control routine shown in FIG. 9 is performed, the control CPU 190 of the control device 180 first outputs a signal for stopping the engine to the EFIECU 170 through data communication (S100). Upon receipt of the signal for stopping the engine, the EFIECU 170 stops fuel injection from the fuel injection valve 151 as well as application of voltage to the ignition plug 162, and further closes completely the throttle valve 166. These processings stop the autonomous operation of the engine 150. Even if the operation has been stopped, the crank shaft 156 of the engine 150 does not stop immediately due to inertia. If the crank shaft 156 is left as it is, the revolution speed of the engine 150 gradually decreases with a deceleration that is determined based on the load coupled to the crank shaft 156, the friction coefficient of the piston 154 and the like, and eventually becomes null. The processing, which will hereinafter be described, is performed such that the revolution speed Ne of the engine 150 decreases not naturally but with a predetermined deceleration.

First, the revolution speed Ne of the engine 150 is inputted to the control CPU 190 (step S192). The revolution speed Ne of the engine 150 can be obtained from the rotational angle θc of the carrier shaft 127 coupled to the crank shaft 156 via the damper 157. The rotational angle θc is detected by the resolver 159 secured to the carrier shaft 127. It is also possible to directly detect the revolution speed Ne of the engine 150 using the revolution sensor 176 secured to the distributor 160. In this case, through data communication, the control CPU 190 receives information on the revolution speed Ne from the EFIECU 170 connected with the revolution sensor 176.

Figure 10:
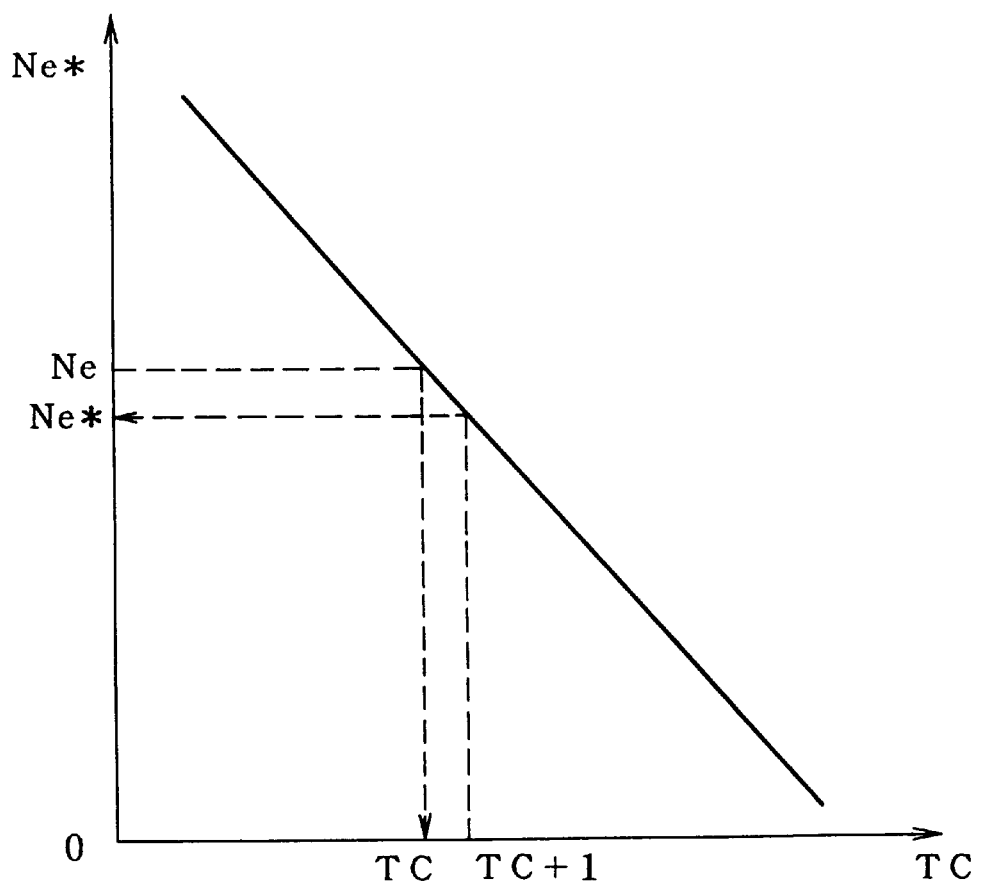
FIG. 10 is a map showing an example of the relationship between time counter TC and the desired revolution speed Ne* of an engine.

Upon input of the revolution speed Ne of the engine 150, the initial value of a time counter TC is set based on the revolution speed Ne inputted (step S104). The time counter TC is a factor used in setting a desired revolution speed Ne* of the engine 150 in step S108, which will later be described. As shown in step S106, the time counter TC is repeatedly incremented every time the processings in steps S106 through S126 are performed. The initial value of the time counter TC is set based on a map for setting the desired revolution speed Ne* of the engine 150 using the time counter TC as a factor, e.g. a map shown in FIG. 10. As shown in FIG. 10, the time counter TC is set by finding a value of the time counter TC that corresponds to the revolution speed Ne selected on the axis of ordinate (the axis of the desired revolution speed Ne*).

The time counter TC is incremented (step S106) after being set. The desired revolution speed Ne* of the engine 150 is set using the thus-incremented time counter TC and a map shown in FIG. 8 (step S108). The desired revolution speed Ne* is set by finding a value of the desired revolution speed Ne* that corresponds to the time counter TC selected on the axis of abscissa (the axis of the time counter TC). FIG. 10 shows that the desired revolution speed Ne* is obtained as "TC1", i.e. by adding 1 to the initial value of the time counter TC. Then, the revolution speed Ne of the engine 150 is inputted (step S110). The torque command value Tm1* of the motor MG1 is set according to a formula (4) shown below using the revolution speed Ne inputted and the desired revolution speed Ne* set (step S112). The first term of the right side of the formula (4) is a proportional term for eliminating a deviation of the revolution Ne from the desired revolution speed Ne*. The second term of the right side of the formula (4) is an integral term for nullifying a steady-state deviation. K1 and K2 are proportionality factors.

$$Tm1^* = K1(Ne^* - Ne) + K2 \int (Ne^* - Ne)dt \qquad (4)$$

Then, the torque command value Tm2* of the motor MG2 is set based on a formula (5) shown below using a torque command value Tr* to be outputted to the ring gear shaft 126 and the torque command value Tm1* of the motor MG1 (step S120). The second term of the right side of the formula (5) represents torque applied to the ring gear shaft 126 via the planetary gear 120 when the torque corresponding to the torque command value Tm1* is outputted from the motor MG1 in a stopped state of the engine 150. K3 is a proportionality factor. In a balanced state of the operational co-line shown in the collinear graph, K3 is equal to 1. However, in a transient state upon stoppage of the engine 150, K3 assumes a value smaller than 1. In the transient state, the torque outputted from the motor MG1 is partially used to change motions of an inertial system consisting of the engine 150 and the motor MG1. To precisely calculate the torque, the torque used for changing motions of the inertial system (inertial torque) is first obtained by multiplying the inertial moment relative to the motor MG1 in the aforementioned inertial system by an angular acceleration of the sun gear shaft 125. The thus-obtained inertial torque is then subtracted from the torque command value Tm1* and divided by the gear ratio p. In the embodiment, since the torque command value Tm1* set in this routine is relatively small, the calculation has been simplified using the proportionality factor K3. The torque command value Tr* to be outputted to the ring gear shaft 126 is set according to a torque setting routine shown in FIG. 11 as an example, based on the depression amount of the accelerator pedal 164 determined by the driver. The processing for setting the torque command value Tr* will hereinafter be described briefly.

$$Tm2^* = Tr^* - K3 \times \frac{Tm1^*}{\rho} \tag{5}$$

Figure 11:
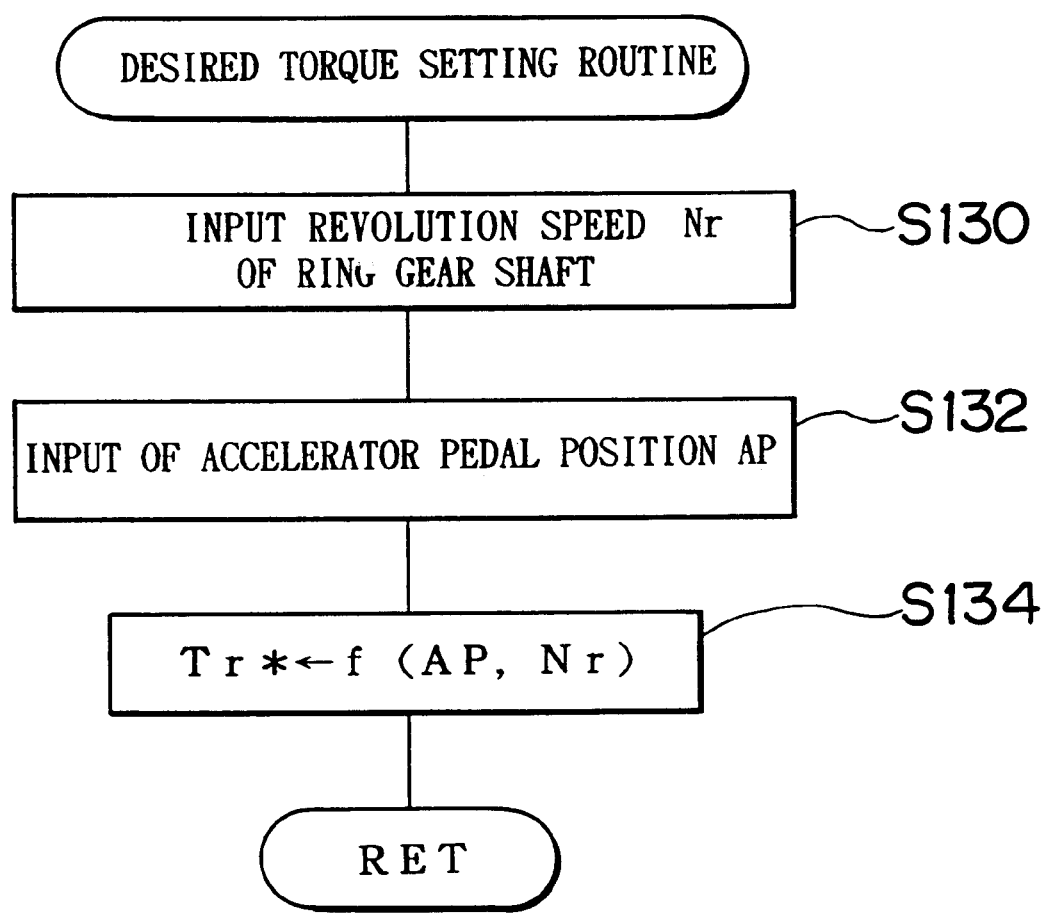
FIG. 11 is a flowchart showing an example of a desired torque setting routine executed by the control device according to the embodiment.
Figure 12:
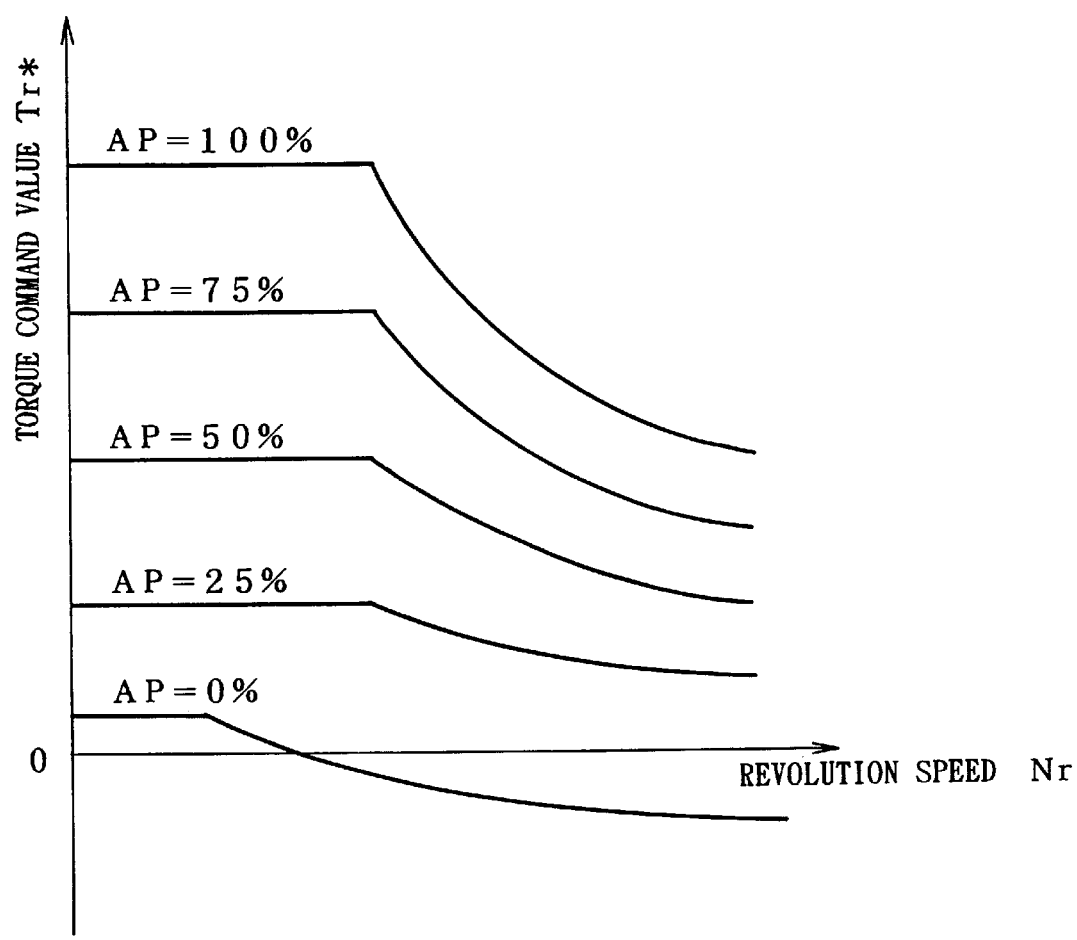
FIG. 12 is an explanatory view showing an example of the relationship among the revolution speed Nr of a ring gear shaft, accelerator pedal position AP and torque command value Tr*.

The required torque setting routine shown in FIG. 11 is repeatedly executed at intervals of a predetermined time period (e.g. 8 msec). When this routine is executed, the control CPU 190 of the control device 180 first reads out the revolution speed Nr of the ring gear shaft 126 (step S130). The revolution speed Nr of the ring gear shaft 126 can be obtained from the rotational angle θr of the ring gear shaft 126. The rotational angle θr is detected by the resolver 149. Then, a processing for inputting the accelerator pedal position AP detected by the accelerator pedal position sensor 164a is performed (step S132). The accelerator pedal 164 is depressed when the driver feels a deficiency in output torque. Thus, the accelerator pedal position AP corresponds to the torque to be outputted to the ring gear shaft 126, i.e. to the driving wheels 116, 118. When the accelerator pedal position AP is read out, a processing for calculating the torque command value Tr* based on the accelerator pedal position AP read out and the revolution speed Nr of the ring gear shaft 126 is performed (step S134). The torque command value Tr* is a desired value of the torque to be outputted to the ring gear shaft 126. The ring gear shaft 126 is mechanically coupled to the driving wheels 116, 118 via the power takeout gear 128, the power transmission gear 111 and the differential gear 114. Therefore, the output torque to be outputted to the ring gear shaft 126 corresponds to the torque to be outputted to the driving wheels 116, 118. This is why the torque to be outputted to the ring gear shaft 126 is calculated instead of calculating the torque to be outputted to the driving wheels 116, 118. In the embodiment, a map showing the relationship among the revolution speed Nr of the ring gear shaft 126, the accelerator pedal position AP and the torque command value Tr* is preliminarily stored in the ROM 190b. When the accelerator pedal position AP is read out, the torque command value Tr* is obtained based on the accelerator pedal position AP thus read, the revolution speed Nr of the ring gear shaft 126 and the map stored in the ROM 190b. FIG. 12 illustrates an example of the map.

In this manner, the torque command value Tm1* of the motor MG1 is set in step S112 and the torque command value Tm2* of the motor MG2 is set in step S114. The motors MG1, MG2 are then controlled such that the torque forces corresponding to those command values thus set are outputted, based on the control routine of the motor MG1 (FIG. 13) and the control routine of the motor MG2 (FIG. 14). Using interruption handling, these control routines are repeatedly executed at intervals of a predetermined time period (e.g. every 4 msec). Such control of the motors MG1, MG2 will later be described.

Referring again to FIG. 9, after calculating the respective torque values Tm1*, Tm2* of the motors MG1, MG2, the control CPU 190 of the control device 180 performs a processing for comparing the revolution speed Ne of the engine 150 with a threshold value Nref (step S116). The threshold value Nref is set as a value approximate to a value set as the desired revolution speed Ne* of the engine 150 in the operation mode processing performed solely by the motor MG2. In the embodiment, since the desired revolution speed Ne* of the engine 150 in the operation mode processing performed solely by the motor MG2 is set to 0, the threshold value Nref is set to a value approximate to 0. This value is smaller than a lower limit value of the revolution area where the system coupled to the crank shaft 156 and the carrier shaft 127, which are coupled to each other via the damper 157, produces resonance phenomena. Accordingly, when the revolution speed Ne of the engine 150 is larger than the threshold value Nref, it is determined that the engine 150 is still in a transient state after stoppage of its operation and that the revolution speed Ne is not below the lower limit value of the revolution area where resonance phenomena are produced. The operation then returns to step S106 and the processings in steps S106 through S116 are repeatedly performed. Every time the processings in steps S106 through S116 are performed, the time counter TC is incremented. The revolution speed Ne* of the engine 150 is set to a small value based on the map shown in FIG. 10. Thus, the revolution speed Ne of the engine 150 decreases with a gradient substantially equal to that of the desired revolution speed Ne* in the map shown in FIG. 10. Therefore, if the gradient of the desired revolution speed Ne* is made larger than a gradient with which the revolution speed Ne naturally changes upon stoppage of fuel injection to the engine 150, it is possible to rapidly reduce the revolution speed Ne of the engine 150. If the gradient of the desired revolution speed Ne* is made smaller than the gradient with which the revolution speed Ne naturally changes, it is possible to gently reduce the revolution speed Ne of the engine 150. The embodiment is designed such that the revolution area where the aforementioned resonance phenomena are produced is passed. Thus, the gradient of the desired revolution speed Ne* is set larger than the gradient with which the revolution speed Ne naturally changes.

On the other hand, if the revolution speed Ne of the engine 150 drops below the threshold value Nref, cancellation torque Tc is set to the torque command value Tm1* of the motor MG1 (step S118), the torque command value Tm2* of the motor MG2 is set in accordance with the aforementioned formula (5) (step S120), and the lapse of a predetermined time period is awaited (step S122). The cancellation torque Tc prevents the so-called undershoot wherein the revolution speed Ne of the engine 150 assumes a negative value. It has already been described hereinbefore why the revolution speed Ne of the engine 150 goes through the undershoot when the motor MG1 undergoing PI control actively stops the operation of the engine 150.

If a predetermined time period elapses in a state where the motor MG1 outputs the cancellation torque Tc, the torque command value Tm1* of the motor MG1 is set to 0 (step S124) and the torque command value Tm2* of the motor MG2 is set to the torque command value Tr* (step S126). This routine is then terminated to perform the operation mode processing solely by means of the MG2, which is not shown.

Figure 13:
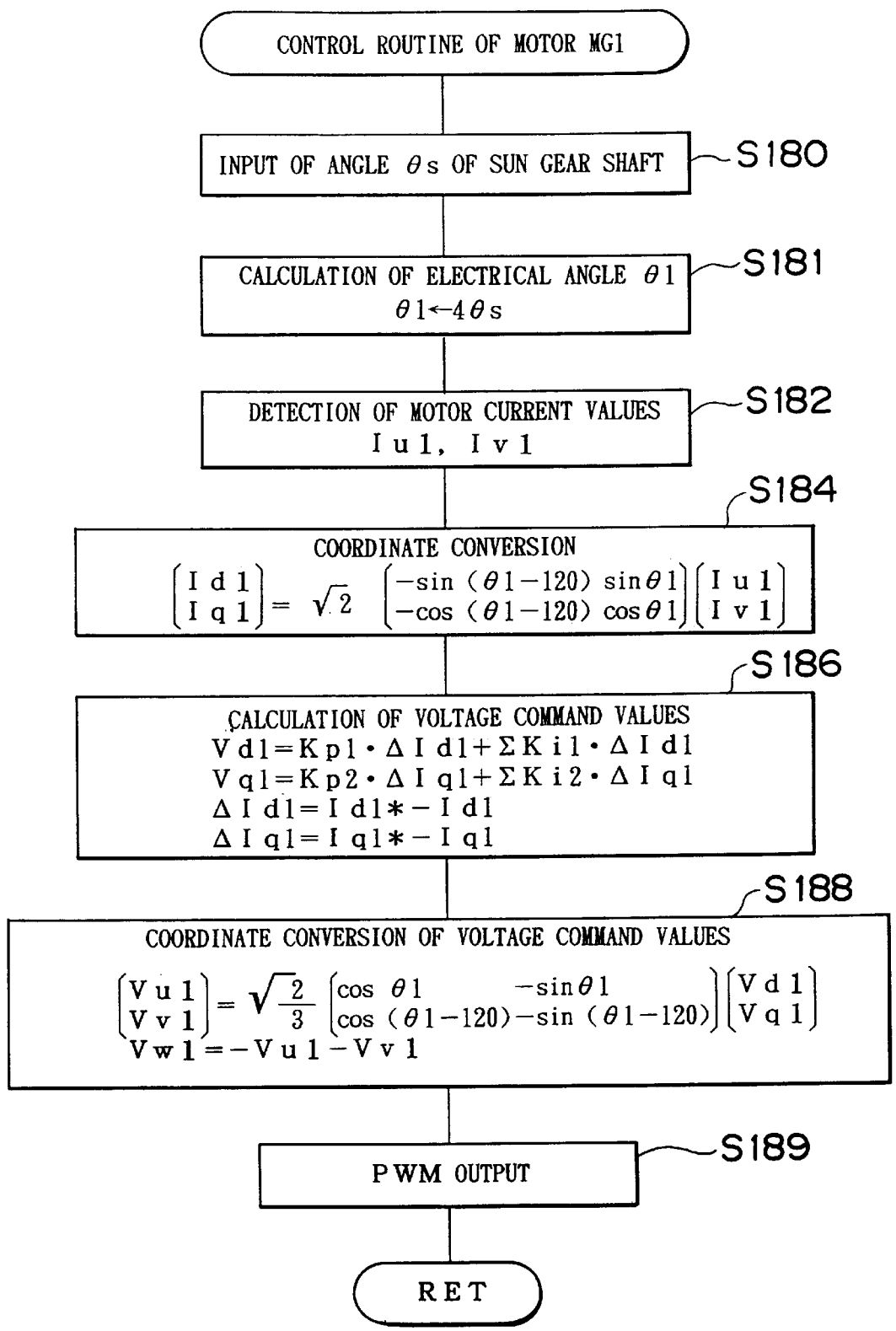
FIG. 13 is a flowchart showing an example of a control routine of a motor MG1 executed by a control CPU of the control device.
Figure 14:
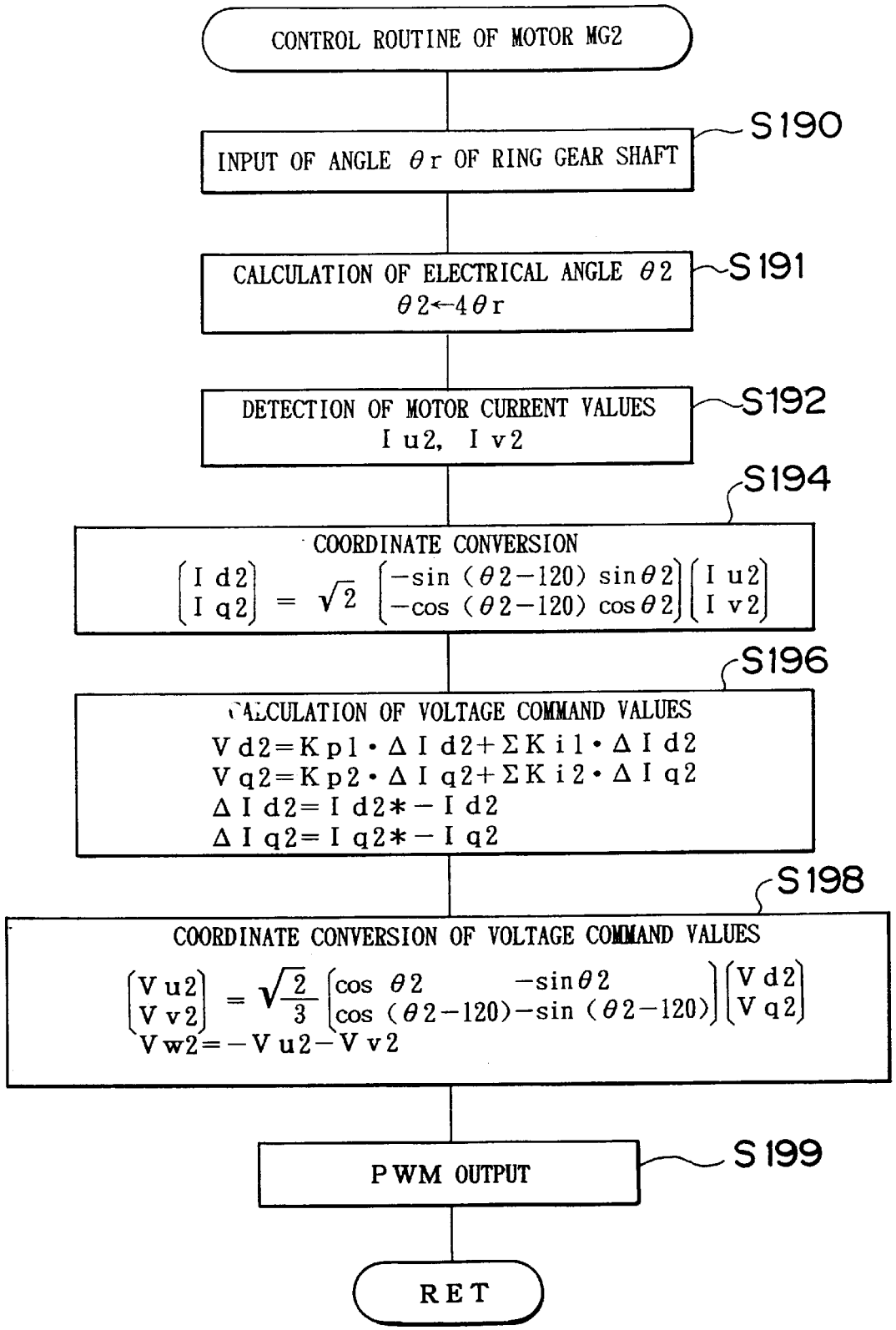
FIG. 14 is a flowchart showing an example of a control routine of a motor MG2 executed by the control CPU of the control device.

The control of the motor MG1 will be described based on a control routine of the motor MG1, which control routine is shown in FIG. 13 as an example. When this routine is executed, the control CPU 190 of the control device 180 first performs a processing for inputting the rotational angle θs of the sun gear shaft 125 from the resolver 139 (step S180) as well as a processing for obtaining an electrical angle θ1 of the motor MG1 from the rotational angle θs of the sun gear shaft 125 (step S181). The embodiment employs a synchronous electric motor of four pole pairs as the motor MG1. Thus, a calculation is made such that θ1=4θs. The current detectors 195, 196 then perform a processing for detecting current Iu1 and current Iv1 flowing through a U-phase and a V-phase of the three-phase coil 134 of the motor MG1 respectively (step S182). Although current flows through the U-, V- and W-phases, the sum of the respective current values is null. Therefore, the measurement of the current values of two phases suffices. Coordinate conversion (three-to-two phase conversion) is performed using the thus-obtained current values of the three phases (step S184). The coordinate conversion is performed to obtain current values on the d- and q-axes of the synchronous electric motor of a permanent magnet type, by carrying out the calculation according to a formula (6) shown below. It is because the current values on the d- and q-axes are essential for torque control in the synchronous electric motor of a permanent magnet type that the coordinate conversion is performed. As a matter of course, it is also possible to perform control without coordinate conversion.

$$\begin{pmatrix} Id1 \\ Iq1 \end{pmatrix} = \sqrt{2} \begin{pmatrix} -\sin(\theta 1 - 120) & \sin\theta 1 \\ -\cos(\theta 1 - 120) & \cos\theta 1 \end{pmatrix} \begin{pmatrix} Iu1 \\ Iv1 \end{pmatrix} \quad (6)$$

After the conversion into the current values on the two axes has been completed, deviations of current command values Id1*, Iq1* on the respective axes from actual values Id1, Iq1 of the current flowing through the respective axes are obtained. The current command values Id1*, Iq1* are obtained from the torque command value Tm1* of the motor MG1. Then, a processing for obtaining voltage command values Vd1, Vq1 on the respective axes is performed (step S186). In other words, the calculation is first carried out according to a formula (7) shown below, where Kp1, Kp2, Ki1 and Ki2 are coefficients. These coefficients are adapted for the characteristics of the motors employed. Each of the voltage command values Vd1, Vq1 consists of a portion proportional to a deviation ΔI from the current command value I* (the first term of the right side of the formula (7)) and the cumulative sum of the deviation ΔI obtained by carrying out cumulation i times (the second term of the right side of the formula (7)).

Vd1=Kp1×ΔId1+ΣKi1×ΔId1 Vq1=Kp2×ΔIq1+Ki2×ΔIq1 (7)

The thus-obtained voltage command values are thereafter subjected to coordinate conversion (two-to-three phase conversion) (step S188), which corresponds to an inversion of the conversion performed in step S184. A processing for obtaining the actual voltages Vu1, Vv1 and Vw1 applied to the three-phase coil 134 is performed. The respective voltages are obtained from a formula (8) shown below.

$$\begin{pmatrix} Vu1 \\ Vv1 \end{pmatrix} = \sqrt{\frac{2}{3}} \begin{pmatrix} \cos\theta 1 & -\sin\theta 1 \\ \cos(\theta 1 - 120) & -\sin(\theta 1 - 120) \end{pmatrix} \begin{pmatrix} Vd1 \\ Vq1 \end{pmatrix} \quad (8)$$

-continued

Vw1 = Vu1 − Vv1

The actual voltage control is performed in accordance with the on-off time periods of the transistors Tr1 through Tr6 in the first drive circuit 191. Thus, the on-time periods of the respective transistors Tr1 through Tr6 are subjected to PWM control so as to obtain the respective voltage command values calculated according to the formula (8) (step S199).

As for the torque command value Tm1* of the motor MG1, it is assumed that the torque Tm1 shown in the collinear graphs in FIGS. 5 and 6 is positive. In this case, even if the torque command value Tm1* invariably assumes a certain positive value, the control to be performed differs depending on respective cases. If the direction of application of the torque command value Tm1* is different from the direction of rotation of the sun gear shaft 125, as in a state indicated by the collinear graph in FIG. 5, regeneration control is performed. If the direction of application of the torque command value Tm1* is the same as the direction of rotation of the sun gear shaft 125, as in a state indicated by the collinear graph in FIG. 6, drive control is performed. However, if the torque command value Tm1* is positive, the transistors Tr1 through Tr6 are controlled in accordance with the regeneration control and drive control of the motor MG1 such that the permanent magnet 135 secured to the outer peripheral surface of the rotor 132 and the revolving magnetic field generated by the current flowing through the three-phase coil 134 apply positive torque to the sun gear shaft 125. Therefore, no matter whether the regeneration control or the drive control is performed, the motor MG1 is subjected to the same switching control. That is, if the sign of the torque command value Tm1* is the same, the motor MG1 is subjected to the same switching control regardless of whether the regeneration control is performed or the drive control is performed. Accordingly, both the regeneration control and the drive control can be performed in accordance with the control routine of the motor MG1 shown in FIG. 13. When the torque command value Tm1* is negative, there is no change caused except that the direction in change of the rotational angle θs of the sun gear shaft 125 read out in step S180 is reversed. Thus, the control routine of the motor MG1 shown in FIG. 13 as an example can be applied to this case without any additional modifications.

The control of the motor MG2 will be described based on a control routine of the motor MG2, which control routine is shown in FIG. 14 as an example. The control processing of the motor MG2 is completely the same as that of the motor MG1 except that the torque command value Tm2* and the rotational angle θr of the ring gear shaft 126 replace the torque command value Tm1* and the rotational angle θs of the sun gear shaft 125. That is, the rotational angle θr of the ring gear shaft 126 is detected using the resolver 149 (step S190), an electric angle θ2 of the motor MG2 is calculated from the rotational angle θr thus detected (step S191) and the current values of the respective phases of the motor MG2 are then detected using the current detectors 197, 198 (step S192). Thereafter, coordinate conversion is performed (step S194) and the voltage command values Vd2, Vq2 are calculated (step S196). Furthermore, the voltage command values are subjected to inverse coordinate conversion (step S198), and the on-off control time periods of the transistors Tr11 through Tr16 in the second drive circuit 192 of the motor MG2 are obtained to perform PWM control (step S199).

The motor MG2 also undergoes either drive control or regeneration control depending on the sign of the torque command value Tm2* and the direction of rotation of the ring gear shaft 126. However, as is the case with the motor MG1, the control processing of the motor MG2 shown in FIG. 12 can perform both the drive control and the regeneration control. In the embodiment, as for the torque command value Tm2* of the motor MG2, it is assumed that the torque Tm2 shown in the collinear graphs in FIG. 5 is positive.

Figure 15:
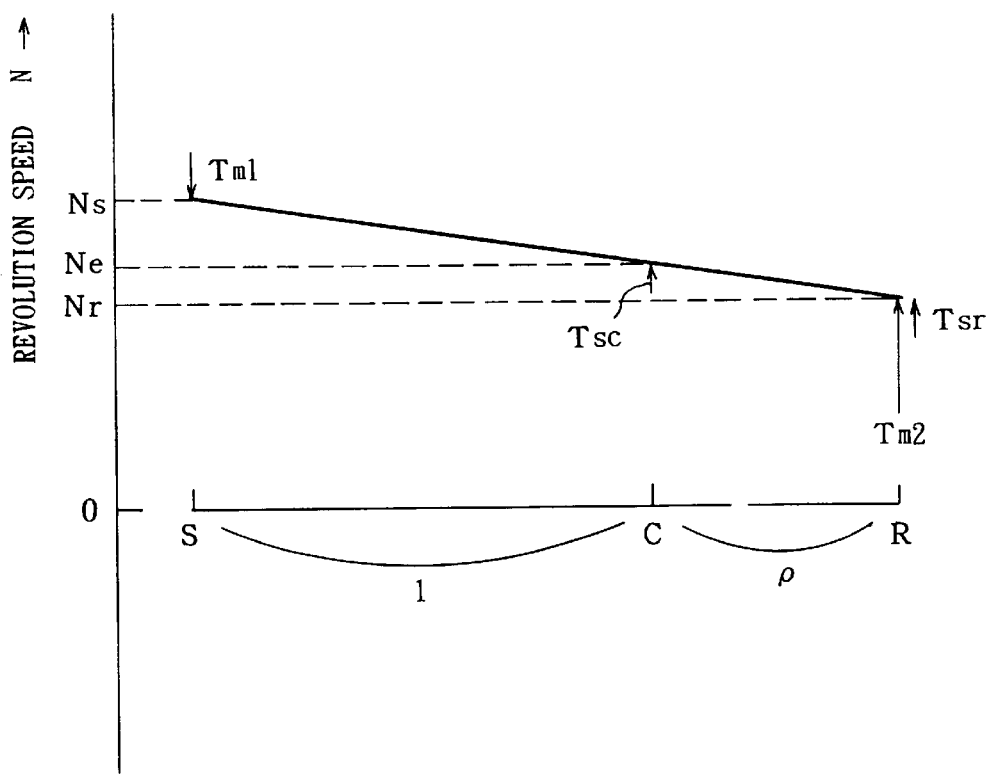
FIG. 15 is a collinear graph at the time when the engine stop control routine in FIG. 7 has been performed for the first time.
Figure 16:
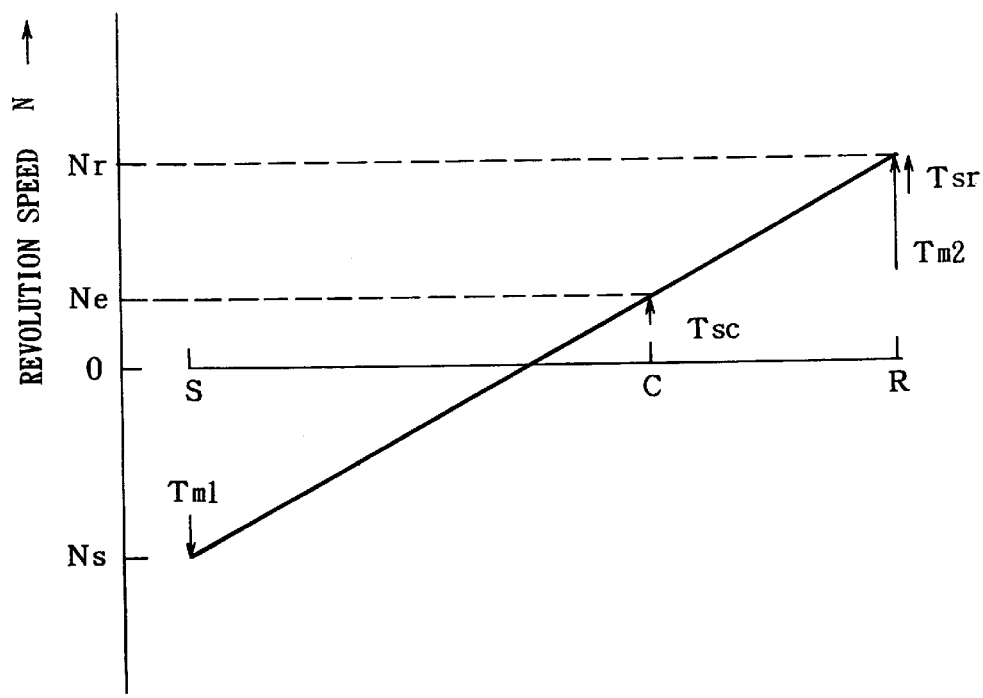
FIG. 16 is a collinear graph at the time when processings in steps S106 through S116 of the engine stop control routine have been executed several times.
Figure 17:
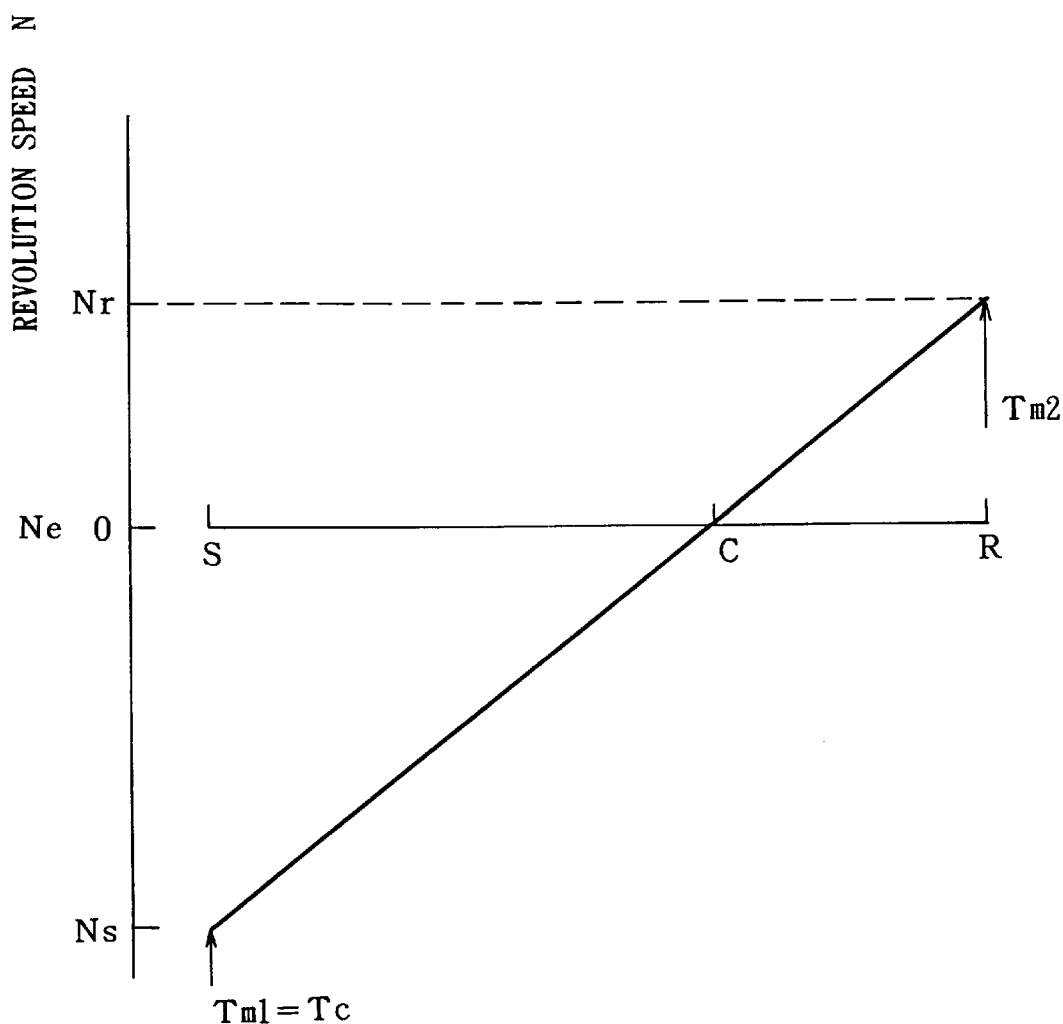
FIG. 17 is a collinear graph at the time when the revolution speed Ne of the engine has dropped below a threshold value Nref.
Figure 18:
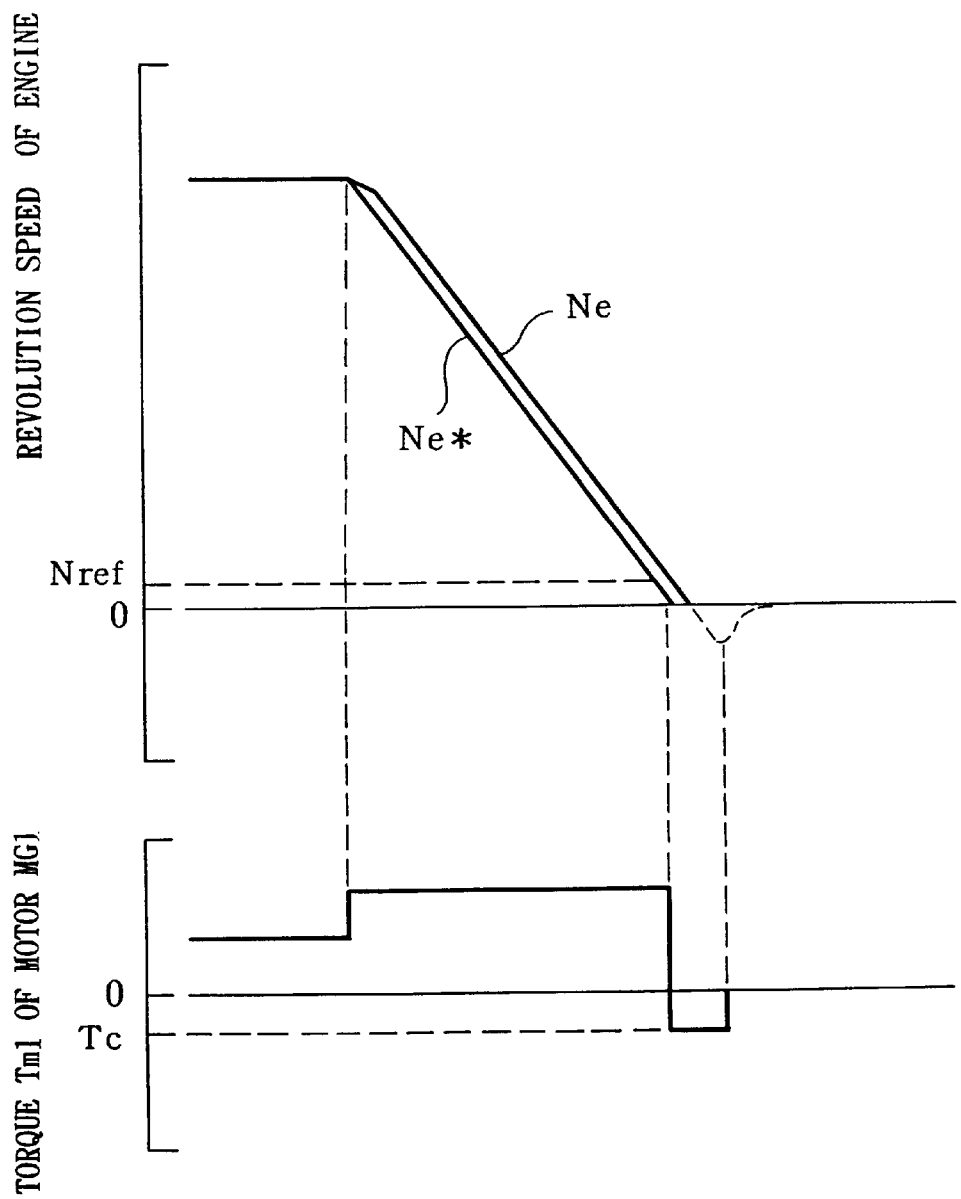
FIG. 18 is an explanatory view showing an example of changes in the revolution speed Ne of the engine and torque Tm1 of the motor MG1.

It will hereinafter be described how the revolution speed Ne of the engine 150, the torque Tm1 of the motor MG1 and the like change, with reference to collinear graphs shown in FIGS. 15 through 17 as examples and an illustrative view shown in FIG. 18 as an example. FIG. 15 illustrates a collinear graph when the engine stop control routine in FIG. 9 has been executed for the first time. FIG. 16 illustrates a collinear graph when the processings in steps S 106 through S116 have been repeatedly executed several times. FIG. 17 illustrates a collinear graph when the revolution speed Ne of the engine 150 has dropped below the threshold value Nref. In the embodiment, the gradient of the desired revolution speed Ne* in the map shown in FIG. 10 is set larger than the gradient with which the revolution speed Ne naturally changes. Therefore, as shown in FIGS. 15 and 16, the torque Tm1 outputted from the motor MG1 acts in such a direction as to forcibly reduce the revolution speed Ne of the engine 150. Accordingly, since the torque Tm1 is applied in the direction opposite to the direction of rotation of the sun gear shaft 125 when the engine stop control routine has been executed for the first time, the motor MG1 operates as a generator. As can be seen from FIG. 16, when the revolution speed Ns of the sun gear shaft 125 thereafter becomes negative, the motor MG1 operates as an electric motor. The motor MG1 is subjected to PI control at this time based on the revolution speed Ne and the desired revolution speed Ne* of the engine 150. Therefore, as shown in FIG. 18, the revolution speed Ne of the engine 150 changes after a slight delay with respect to the desired revolution speed Ne*. As has been described with reference to FIG. 6, the revolution speed Ns of the sun gear shaft 125 may become negative depending on the revolution speed Ne of the engine 150 and the revolution speed Nr of the ring gear shaft 126 in a state prior to the output of a command to stop operation of the engine 150. Thus, the collinear graph in FIG. 16 may refer to the case where the engine stop control routine has been executed for the first time, in this case, the motor MG1 operates as an electric motor from the outset.

In the states shown in the collinear graphs in FIGS. 15 and 16, the injection of fuel into the engine 150 is suspended and thus no torque is outputted from the engine 150. However, since the motor MG1 outputs the torque Tm1 in such a direction as to forcibly reduce the revolution speed Ne of the engine 150, the carrier shaft 127 receives torque Tsc as a resistance against the torque Tm1. On the other hand, the ring gear shaft 126 receives the torque Tm2 outputted from the motor MG2 and torque Tsr outputted to the ring gear shaft 126 via the planetary gear 120 due to the torque Tm1 outputted from the motor MG1. As described hereinbefore, the torque Tsr applied to the ring gear shaft 126, which can be obtained from the change in motions of the inertial system consisting of the engine 150 and the motor MG1 as well as the balance of the operational collinear graphs, is approximately equal to the second term of the right side of the formula (5). Consequently, the torque substantially equal to the torque command value Tr* is outputted to the ring gear shaft 126.

If the revolution speed Ne of the engine 150 drops below the threshold value Nref as a result of the repeated execution of the engine stop control routine shown in FIG. 9 (step S116), the cancellation torque Tc is outputted from the motor MG1. Thus, the revolution speed Ne of the engine 150 becomes null without causing undershoot as indicated by a dotted line in FIG. 18, and the transition to the processing for the operation mode solely by the motor MG2 is smoothly conducted. In the embodiment, at the time of the operation mode solely by the motor MG2, the torque command value Tm1* of the motor MG1 is set to 0. For this reason, the collinear graph eventually comes to a state where the sum of the energy necessary for idle rotation of the engine 150 and the energy necessary for idle rotation of the motor MG1 assumes its minimum value. In the embodiment, a gasoline engine is employed as the engine 150. Therefore, the energy necessary for idle rotation of the engine 150, i.e. the energy necessary for friction, compression or the like of the piston of the engine 150 becomes larger than the energy necessary for idle rotation of the rotor 132 of the motor MG1. Accordingly, as shown in FIG. 17, the collinear graph comes to a state where the engine 150 is stopped and the motor MG1 idle-rotates. The collinear graph in FIG. 17 also describes the cancellation torque Tc outputted from the motor MG1.

The power output device 110 according to the embodiment, which has been described hereinbefore, makes it possible to determine with high precision whether or not the engine 150 can be stopped under the aforementioned conditions, and to rapidly bring the revolution speed Ne of the engine 150 to null after a command to stop operation of the engine 150. Therefore, it is possible to rapidly pass the area where the inertial mass consisting of the engine 150 and the motor MG1 causes torsional resonance phenomena. As a result, it is possible to simplify the construction of the damper 157 for restricting the amplitude of torsional vibration.

Furthermore, the power output device 110 according to the embodiment can prevent undershoot of the revolution speed Ne of the engine 150. This is because the motor MG1 outputs the cancellation torque Tc in such a direction as to increase the revolution speed Ne of the engine 150 immediately before the revolution speed Ne of the engine 150 becomes null. Consequently, it is possible to prevent the generation of vibration and noise, which tend to be caused by the aforementioned undershoot.

Figure 19:
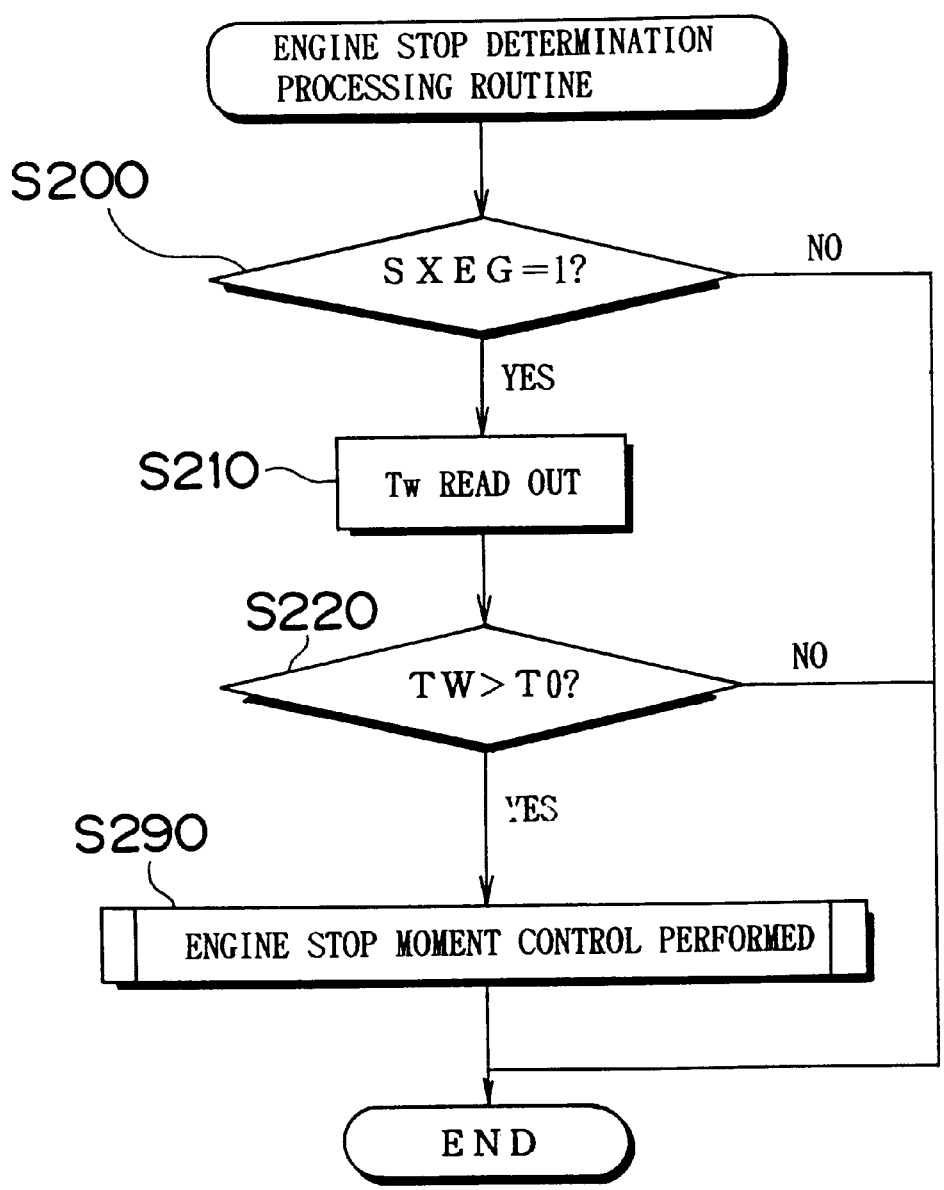
FIG. 19 is a flowchart showing an engine stop determination processing routine according to a second embodiment of the present invention.

A second embodiment of the present invention will now be described. The power output device according to the second embodiment is constructed in the same manner as that according to the first embodiment except that a processing shown in FIG. 19 is performed to determine whether or not the engine 150 can be stopped. In the second embodiment, the control device 180 confirms that the flag SXEG is set to 1 to see if there is no need to continue operation of the engine 150 due to the conditions of the SOC and the like of the battery 194 (step S200). The control device 180 then performs a processing for reading out coolant temperature Tw of the engine 150 from the coolant temperature sensor 174 (step S210). The coolant temperature Tw of the engine 150 is a parameter that is closely related to the warm-up state of the engine 150. For this reason, the coolant temperature Tw is read out to acquire a knowledge of the warm-up state of the engine 150.

Thereafter, it is determined whether or not the coolant temperature Tw is higher than a predetermined value T0 (70° C. in the present embodiment) (step S220). If the coolant temperature Tw is higher than the predetermined value T0, it is determined that the warm-up process has been completed and the engine stop moment control is performed (step S290). Since the engine stop moment control is the same as that of the first embodiment (step S90 in FIG. 7) which has already been described in detail with reference to FIGS. 9 through 18, the description thereof will not be repeated further below. If the coolant temperature Tw is lower than the predetermined value T0, it is determined that the warm-up process has not been completed yet and no control is performed. The operation then proceeds to the "END" and this routine is temporarily terminated.

The power output device according to the second embodiment, which performs the aforementioned processings, does not perform the control for stopping the engine 150 (step S290) prior to completion of the warm-up process thereof, even if there is no demand for continuation of the operation of the engine 150. Thus, for example, the catalytic converter 155 can be sufficiently warmed up. As a result, there is no possibility of the exhaust gas purification performance deteriorating. Furthermore, prior to completion of the warm-up process, the engine 150 has insufficient lubricity and the prime mover undergoes considerable friction. Therefore, it may be difficult to adjust rotational deceleration of the output shaft of the engine 150 to a predetermined range. However, the present embodiment is designed to stop the engine 150 after completion of the warm-up process. Thus, as is the case with the first embodiment, the second embodiment makes it possible to stop the engine 150 while adjusting the rotational deceleration to a predetermined range, and to avoid the problem of torsional resonance.

The power output device 110 according to the aforementioned embodiments employs PM-type (Permanent Magnet type) synchronous electric motors as the motors MG1, MG2. However, it is also possible to employ VR-type (Variable Reluctance type) synchronous electric motors, vernier motors, DC electric motors, induction electric motors, superconducting motors, stepping motors and the like as long as these motors can perform both regenerative operation and drive operation.

The power output device 110 according to the embodiments employs transistor inverters as the first and second drive circuits 191, 192. However, it is also possible to employ IGBT (Insulated Gate Bipolar mode Transistor) inverters, thyristor inverters, voltage PWM (Pulse Width Modulation) inverters, square wave inverters (voltage waveform inverters, current waveform inverters), resonance inverters and the like.

Furthermore, although it is possible to employ a Pb battery, a NiMH battery, a Li battery and the like as the battery 194, the battery 194 can be replaced by a capacitor.

In another form of the present invention, the power output device may be modified as follows. That is, the torque controller and the electric motor are integrated with each other, and the electric motor is provided with a first rotor coupled to the output shaft of the prime mover, a second rotor rotatable relative to the first rotor and coupled to the drive shaft, and windings for exchanging electric power in accordance with relative rotation of the first and second rotors. Since the output shaft of the prime mover is coupled to a heavy rotor, this construction also causes a problem of torsional resonance or the like. Thus, the employment of the construction proposed by the present application provides a great advantage.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention. For example, the power output device according to the embodiments is also applicable to transportation means such as ships and air crafts and a variety of other industrial machines.

What is claimed is:

1. A power output device comprising:

a prime mover outputting power by means of fuel combustion;

a torque controller interposed between an output shaft of said prime mover and a drive shaft and that controls torque outputted to said drive shaft;

an electric motor capable of inputting and outputting power to and from, respectively, said torque controller;

a prime mover operating state determiner that determines an operating state of said prime mover based on demands imposed on the power output device and outputs an operation stop command to stop operation of said prime mover if it is determined that there is no need to continue operation of said prime mover;

a stop condition determiner that determines whether or not a condition allowing stoppage of said prime mover is met; and a stop moment control executer that stops fuel supply to said prime mover, applies torque to said output shaft, adjusts rotational deceleration of said output shaft to a predetermined range and stops said prime mover if a command to stop the prime mover in operation is outputted from said prime mover operating state determiner and it is determined by said stop condition determiner that the condition allowing stoppage of said prime mover is met.

2. The power output device according to claim 1, wherein said stop condition determiner determines that the condition allowing stoppage of said prime mover is not met if a warm-up process of said prime mover has not been completed.

3. The power output device according to claim 1, further comprising a power control device coupled to said drive shaft, wherein said stop condition determiner determines that the condition allowing stoppage of said prime mover is not met if said power control device is in operation.

4. The power output device according to claim 3, wherein said power control device is a slip prevention device that prevents excessive slippage of wheels coupled to said drive shaft.

5. The power output device according to claim 1, wherein said stop condition determiner determines that the condition allowing stoppage of said prime mover is met if it is determined that a condition allowing reduction of a reaction force that may be applied to said drive shaft is met in stopping said prime mover.

6. The power output device according to claim 5, further comprising wheels coupled to said drive shaft and a brake device coupled to said drive shaft and braking said wheels, wherein said stop condition determiner determines that the condition allowing reduction of said reaction force is met if said brake device is in operation.

7. The power output device according to claim 5, further comprising a second electric motor different from said electric motor and coupled to said drive shaft, wherein said stop condition determinater determines that the condition allowing reduction of said reaction force is met if said second electric motor is capable of outputting torque that reduces said reaction force to said drive shaft.

8. The power output device according to claim 1, further comprising a second electric motor different from said electric motor and coupled to said drive shaft, wherein said stop condition determinater determines that the condition allowing stoppage of said prime mover is met if said second electric motor causes said drive shaft to rotate in a direction opposite to a direction in which the output shaft of said prime mover rotates.

9. The power output device according to claim 1, wherein said torque controller couples said drive shaft to said output shaft and is provided with a three-shaft power input and output device, including a rotational shaft of said electric motor, that, when powers are inputted and outputted to and from two of said three shafts, inputs and outputs a power that is determined based on said inputted and outputted powers to and from, respectively, the other shaft.

10. A method of stopping a prime mover in a power output device, comprising:

determining an operating state of said prime mover based on demands imposed on the power output device including the prime mover outputting power by means of fuel combustion, a torque controller interposed between an output shaft of said prime mover and a drive shaft and controlling torque outputted to said drive shaft and an electric motor capable of inputting and outputting power to and from, respectively, said torque controller, and determining whether or not it is necessary to continue operation of said prime mover;

determining whether or not a condition allowing stoppage of said prime mover is met; and stopping fuel supply to said prime mover, applying torque to said output shaft, adjusting rotational deceleration of said output shaft to a predetermined range and performing stop moment control for stopping said prime mover if it is determined that there is no need to continue operation of said prime mover and that the condition allowing stoppage of said prime mover is met.

* * * * *